(12) United States Patent
Agarwal et al.

(10) Patent No.: US 10,902,277 B2
(45) Date of Patent: Jan. 26, 2021

(54) MULTI-REGION DETECTION FOR IMAGES

(71) Applicant: MICROSOFT TECHNOLOGY LICENSING, LLC, Redmond, WA (US)

(72) Inventors: Abhishek Agarwal, Hyderabad (IN); Sachin Talreja, Hyderabad (IN); Rahul Bhuptani, Hyderabad (IN); Mahesh Sridharan, Hyderabad (IN); Onkar Nath Tiwari, Hyderabad (IN); Rajiv Kumar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 16/127,209

(22) Filed: Sep. 10, 2018

(65) Prior Publication Data

US 2020/0082195 A1   Mar. 12, 2020

(51) Int. Cl.
| | | |
|---|---|---|
| *G06F 3/0481* | (2013.01) | |
| *G06F 3/0484* | (2013.01) | |
| *G06K 9/32* | (2006.01) | |
| *G06T 7/13* | (2017.01) | |
| *H04N 1/00* | (2006.01) | |
| *H04N 1/203* | (2006.01) | |
| *H04N 1/38* | (2006.01) | |

(52) U.S. Cl.
CPC ....... *G06K 9/3241* (2013.01); *G06F 3/04815* (2013.01); *G06F 3/04845* (2013.01); *G06T 7/13* (2017.01)

(58) Field of Classification Search
None
See application file for complete search history.

(56) References Cited

U.S. PATENT DOCUMENTS

| | | | | |
|---|---|---|---|---|
| 6,151,426 | A * | 11/2000 | Lee ..................... | H04N 1/3872 382/319 |
| 8,704,896 | B2 * | 4/2014 | Nijemcevic .......... | G06K 9/3216 348/207.1 |
| 9,754,163 | B2 | 9/2017 | Segalovitz et al. | |
| 2003/0113033 | A1 * | 6/2003 | Huang ................. | G06K 9/2054 382/282 |
| 2009/0252373 | A1 | 10/2009 | Paglieroni et al. | |
| 2011/0069180 | A1 * | 3/2011 | Nijemcevic .......... | G06K 9/3216 348/207.1 |
| 2012/0087579 | A1 | 4/2012 | Guerzhoy et al. | |

(Continued)

OTHER PUBLICATIONS

Guntur, Caroline, "Scanning Goes Mobile: An In-Depth Review of Photomyne", Retrieved From: https://www.organizingphotos.net/photomyne-review/, Sep. 5, 2016, 16 Pages.

(Continued)

*Primary Examiner* — Soo Shin
(74) *Attorney, Agent, or Firm* — NovoTechIP International PLLC

(57) ABSTRACT

An image captured by a camera can be processed by a scanning application to identify one or more regions within the image that are suitable for scanning. One or more of these regions can be selected for scanning automatically based on user-input such as a fingertip touch to a particular portion of the display screen. Users may also select multiple regions and submit multiple quadrangular regions for scanning to PDF from a single image.

18 Claims, 16 Drawing Sheets

(56) References Cited

U.S. PATENT DOCUMENTS

| | | | | |
|---|---|---|---|---|
| 2012/0131520 | A1* | 5/2012 | Tang | G06F 3/04842 |
| | | | | 715/863 |
| 2013/0135689 | A1 | 5/2013 | Shacham et al. | |
| 2013/0335575 | A1 | 12/2013 | Tsin et al. | |
| 2014/0137039 | A1* | 5/2014 | Kroeger | G06F 3/04817 |
| | | | | 715/810 |
| 2014/0240362 | A1* | 8/2014 | Kurita | G06F 1/1637 |
| | | | | 345/661 |
| 2016/0070978 | A1* | 3/2016 | Song | G06T 3/00 |
| | | | | 348/239 |
| 2016/0171158 | A1* | 6/2016 | Park | G06F 19/321 |
| | | | | 715/771 |

OTHER PUBLICATIONS

Ingraham, Nathan, "Google's New Photoscan App Makes it Easy to Digitize Old Prints", Retrieved From: https://www.engadget.com/2016/11/15/google-photos-photoscan-app-editing-tools/, Nov. 15, 2016, 13 Pages.

"International Search Report and Written Opinion Issued in PCT Application No. PCT/US2019/038841", dated Sep. 25, 2019, 12 Pages.

Rehm, Lars, "Unfade for iOS Scans and Restores Old Prints", Retrieved From: https://www.dpreview.com/news/2782682139/unfade-for-ios-scans-and-restores-old-prints, May 26, 2016, 6 Pages.

\* cited by examiner

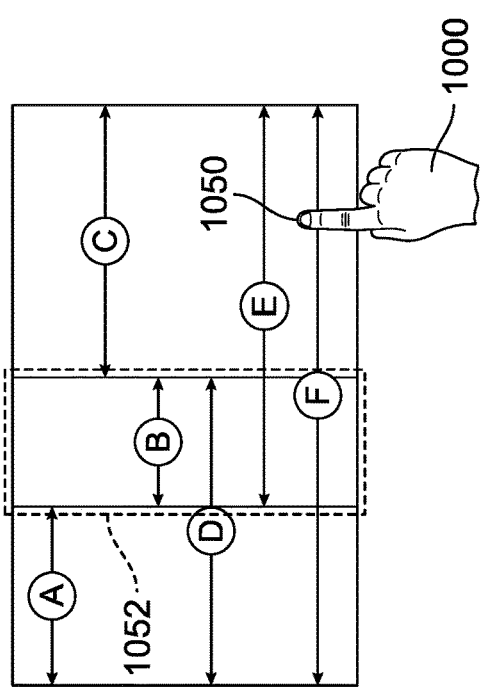
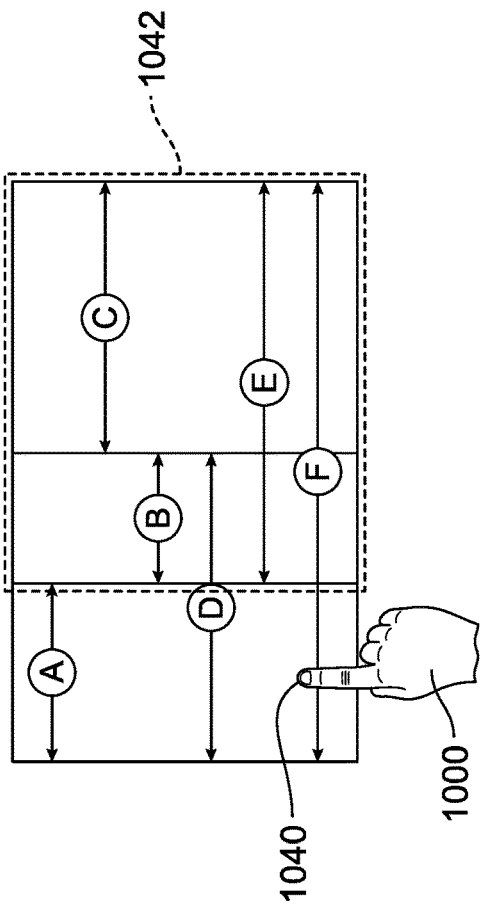
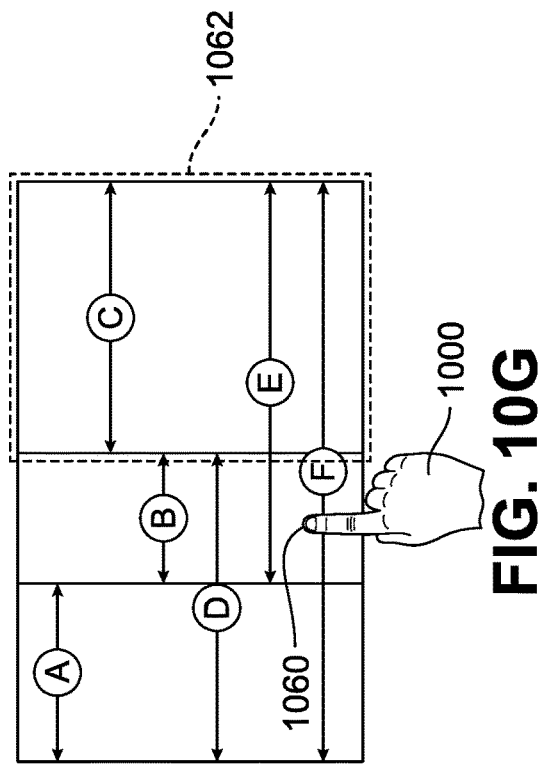

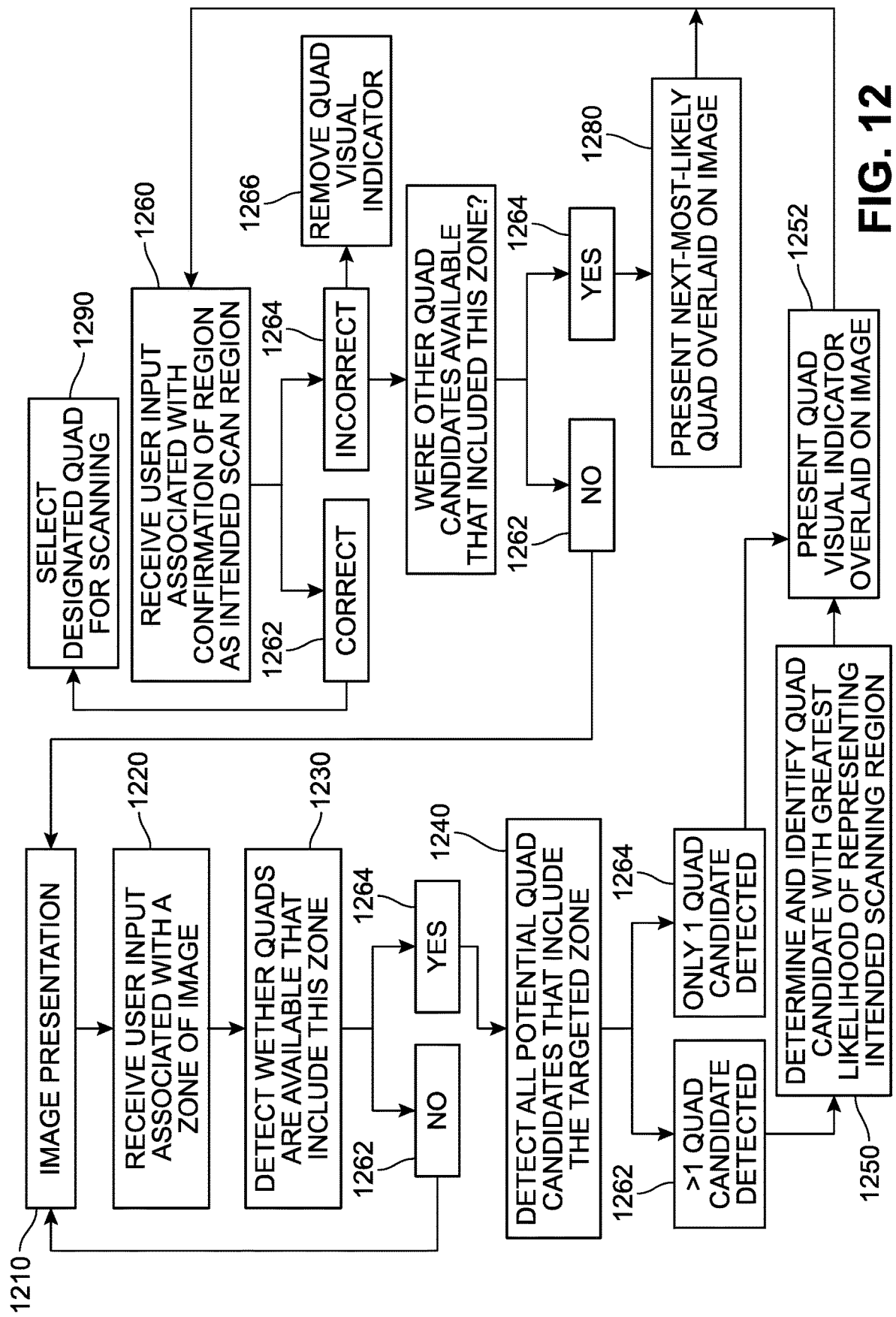

MULTI-REGION DETECTION FOR IMAGES

BACKGROUND

Computing devices that include cameras are increasingly more common in mobile devices, including laptop computers, tablets, digital cameras, smartphones, as well as other mobile data, messaging, and/or communication devices. Generally, users make use of cameras associated with computing devices to take various pictures, such as images of scenery, persons, presentations, whiteboards, business cards, documents, sketches, paintings, and so forth. The users can refer to the captured images to recall information contained therein such as diagrams, pictures, lists and other text, and/or to electronically deliver them to other users, storage services, or devices. Traditionally, however, images captured by a camera are static, and extracting specific regions in the image to obtain electronically usable and/or editable information via scanning may be challenging.

In addition, because a photo typically is fairly large in size and includes abundant textual and graphical information, the image region automatically selected for capture by the device may not be the one desired by the user. Recognition of the particular portion of an image that includes the user's item of interest has remained both inefficient and error prone. Thus, there remain significant areas for new and improved ideas for the efficient scanning of images, as well as the management of the image region selection process for a user.

SUMMARY

A data processing device, in accord with a first aspect of this disclosure, includes at least one processor and one or more computer readable media. The computer readable media include instructions which, when executed by the at least one processor, cause the at least one processor to present an image on a display via an image scanning application. The instructions also cause the at least one processor to receive a first input associated with a first zone of the image, and automatically detect, in response to receiving the first input, a first region that includes at least the first zone, the first region being bounded by a first perimeter. The instructions also cause the at least one processor to present on the display via the image scanning application the first region to a user as a potential region for scanning.

A method, in accord with a second aspect of this disclosure, includes presenting an image on a display via an image scanning application. The method also includes receiving a first input associated with a first zone of the image. In addition, the method involves automatically detecting, in response to receiving the first input, a first region that includes at least the first zone. The first region is bounded by a first perimeter. Furthermore, the method includes presenting on the display via the image scanning application the first region to a user as a potential region for scanning.

A method, in accord with a third aspect of this disclosure, includes presenting an image on a display via an image scanning application, and receiving a first input associated with a first zone of the image. In addition, the method includes automatically presenting, in response to receiving the first input, a first quadrangular region that includes at least the first zone. In another step, the method includes receiving a second input associated with a second zone of the image, where the second zone is located outside of the first quadrangular region. Furthermore, the method includes automatically presenting, in response to receiving the second input, a second quadrangular region that includes at least the first quadrangular region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 10A-10G are schematic diagrams illustrating an implementation of an application configured to detect varying regions in an image in response to multiple user inputs;

FIG. 12 is a process flow diagram of an implementation for a scanning selection tool;

DETAILED DESCRIPTION

Figure 1A:
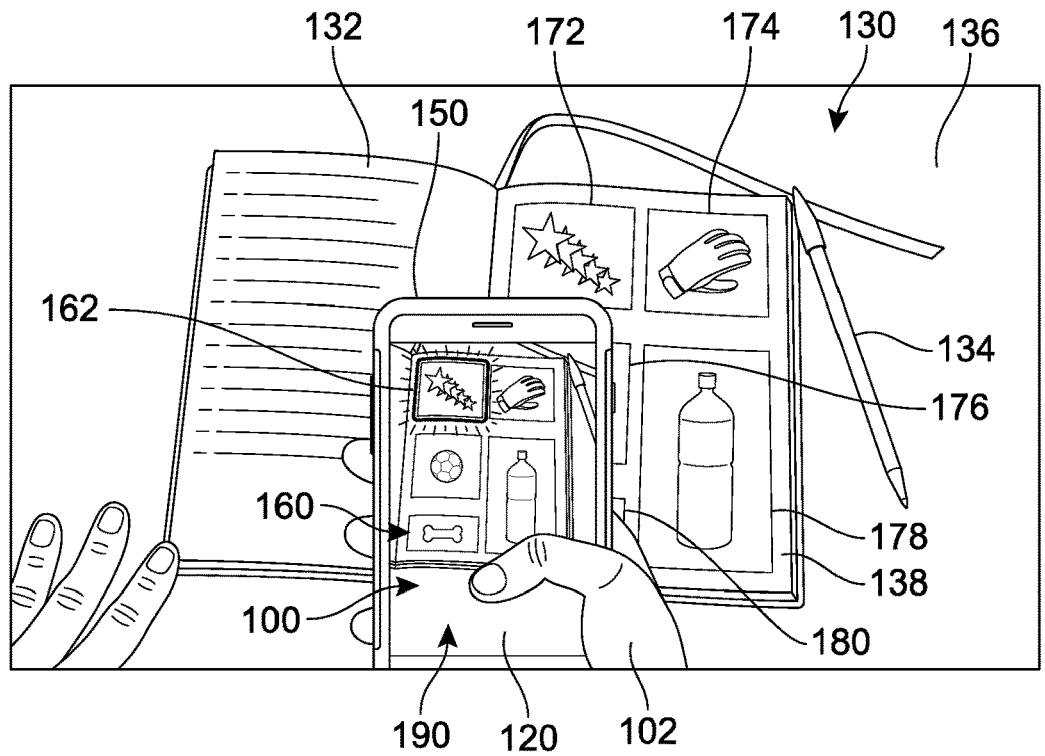
FIGS. 1A and 1B each illustrate an implementation of an image scanning application and environment.

In the following detailed description, numerous specific details are set forth by way of examples in order to provide a thorough understanding of the relevant teachings. However, it should be apparent that the present teachings may be practiced without such details. In other instances, we\ll known methods, procedures, components, and/or circuitry have been described at a relatively high-level, without detail, in order to avoid unnecessarily obscuring aspects of the present teachings.

The following implementations introduce a scan application toolbox that may enhance the user scanning experience by receiving an input that can be utilized by the application to determine which region will be detected and/or identified for scanning in an image. Traditionally, the scanning workflow has included a series of steps where a user can: (1) point a camera at a document; (2) take a photo; (3) crop or drag the document boundaries to more precisely surround the object of interest; (4) clean up the selected image content (filter, perspective correction, etc.) and; (5) save the file and/or share the scanned item. In order to identify a region for scanning, some applications may detect what is referred to as a "quad" or quadrangular-shaped region. In some cases, a quad represents a document or other object where any other scene artifacts or background are dropped or removed. However, traditional scanning-based applications often designate undesirable quadrangular regions in images. Furthermore, in cases where there are multiple quads that may be detected in an image, there is a lower likelihood of detection of the particular quad the user had intended to capture. The disclosed implementations allow a user to view previously captured (static) images and/or an image captured in real-time (live) and submit an input(s) that can be used to identify a specific quad in the image for scanning. The ability to quickly and effectively direct an application to the desired portion of an image for scanning can allow users to increase workflow efficiency when working with electronic content. Furthermore, this system can offer users a broader awareness of the existence or availability of multiple distinct regions of scannable image content while viewing the larger image.

As introduced above, various applications can be used to capture and/or edit digital images or electronic content. For purposes of this description, the term "electronic content" or "image" includes any digital data that may be visually represented, including but not limited to an electronic document, a media stream, real-time video capture, real-time image display, a document, web pages, a hypertext document, any image, digital video or a video recording, animation, and other digital data. As an example, this electronic content may include image capture and photo scanning applications, or other software configured to provide tools for use with digital images.

Furthermore, within some types of documents, the electronic content can be understood to include or be segmented into one or more units that will be referred to as image content regions ("content regions"), or more simply, regions. For purposes of this application, the term "region" describes portions of digital content that are identifiable and/or selectable as distinct or discrete segments of an image. As an example, one collection of electronic content (such as a digital photograph) can be characterized as or by a plurality of regions that may each include one or more image content portions ("content portions"). In different implementations, a first image content region may overlap with a portion of another, second image content region in the same image. Thus, a content region includes any part of an electronic content that may be defined or discernable by the system. For example, a content region may be automatically discerned from a characteristic of the content portion itself or relative to other content portions (e.g., a color, luminosity level, an edge detection, shape, symbol, pixel), or may be manually defined by a reviewer or end-user (e.g., selected set of pixels or object), or any other selected portion of a digital image.

Furthermore, an end-user (or "user") for purposes of this application is one who captures, edits, views, manages, or deletes pieces of electronic content, including the creation, viewing, or updating of selected regions in the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include photography software, image capture/editing applications, word processors, spreadsheets, slideshows, presentation design applications, accounting systems, and telecommunication programs, as well as gaming software, utility and productivity tools, mobile applications, presentation graphics, and other productivity software.

The software application that may incorporate the disclosed features can be installed on a client's device, or be associated with a third-party application, such as a web-browser application that is configured to communicate with the device. These devices can include, for example, desktop computers, mobile computers, mobile communications devices (such as mobile phones, smart phones, tablets, etc.), smart televisions, gaming devices, set-top boxes, and/or any other computing devices that include a camera and/or an image-display capability.

Generally, such scanning applications permit end-users to scan documents, presentations, real-world objects, and other subjects using images captured by a camera associated with the device or via images stored or accessed from memory. Furthermore, in some implementations, camera-based scanning applications can be configured to correct for the effects of perspective on rectangular or other polygonal objects such as paper, business cards, whiteboards, screens, and so forth. In different implementations, software applications such as programs offered in the Microsoft Office Suite® (e.g., Office Lens®, Powerpoint®, Visio®) and other applications can offer a variety of image capturing and editing tools, including scanning and identification of different regions in an image. Other examples include Microsoft Safety Scanner®, VueScan®, Picasa®, TWAIN®, Windows Fax and Scan®, PaperPort®, SilverFast®, Genius Scan®, TurboScan®, Scanner Pro®, Prizmo®, Google Photo-Scans® and Helmut Film Scanner®, Google Drive®, Evernote Scannable®, Dropbox®, Scanbot®, CamScanner®, Photomyne®; these are non-limiting examples, and any other electronic content editing or viewing application may benefit from the disclosed implementations.

During the scanning of an image, end-users can be slowed or hindered in cases where there are multiple potential regions available for scanning. For purposes of this application, scan or scanning refers to the mechanism by which an application identifies, selects, isolates, or otherwise determines a boundary for a particular region in an image that may be of interest to a user. Thus, scanning may occur in real-time (e.g., while a camera is pointed at a scene or object(s)) and/or following the capture, generation, or storing of an image in memory, and may be understood to permit a high-resolution capture of a particular region within an image. In other words, scanning can in some implementations involve the capture of a smaller region within a larger, captured image.

The following implementations are configured to provide users with the ability to detect quads around a given locus. In some implementations, if multiple quads are available or detected in an image, a finger tap by a user in an area associated with the desired quad can be configured to help determine boundaries (i.e., a perimeter) of a potential quad associated with the 'tapped' region. Such an application enables users to capture one or multiple quads of their choice. Thus, in different implementations, a user can aim a camera of a portable device towards a subject and initiate a capture or recording of an image of the subject using a button, voice command, touch, stylus, mouse, direction keys, and/or other suitable input devices. When the capture is initiated by the user, a capture operation can occur to capture an image of the subject. The image capture can initiate various processing of the captured image to detect a first scannable region and present the region to the user. A touch input or touch event on a touch-screen can indicate the user's area of interest, and detection of a different, second region will be attempted. The location of the touch input can be used to narrow the range of possible regions to only those that include the image content portion identified by the user.

Figure 1B:
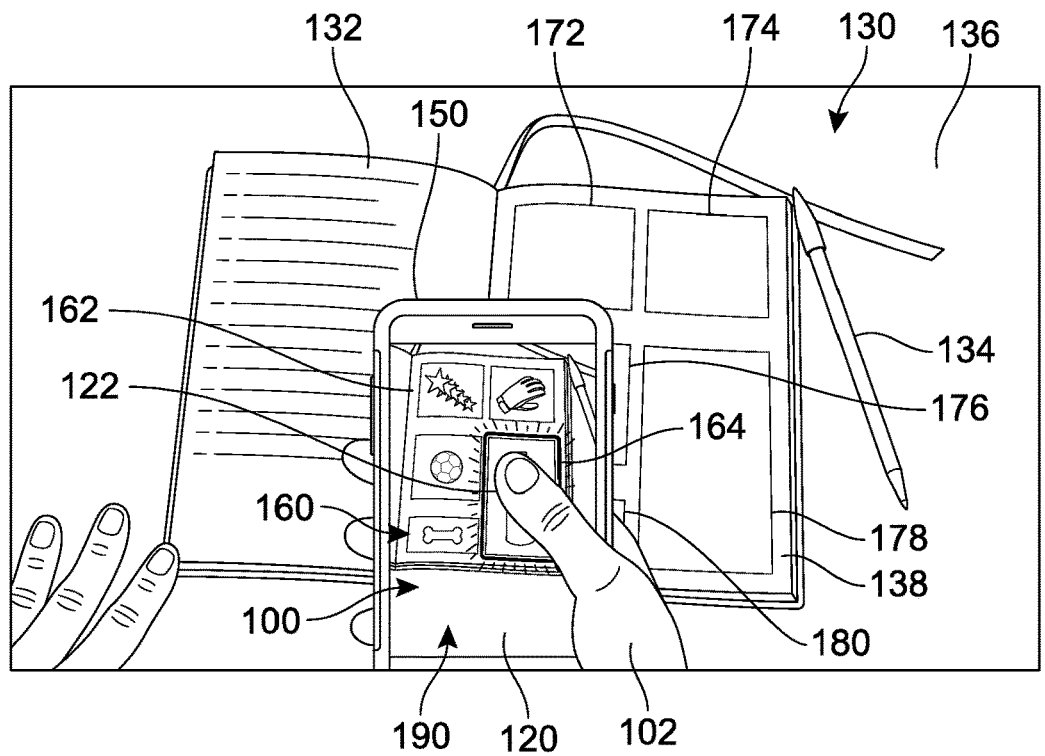
Figure 2:
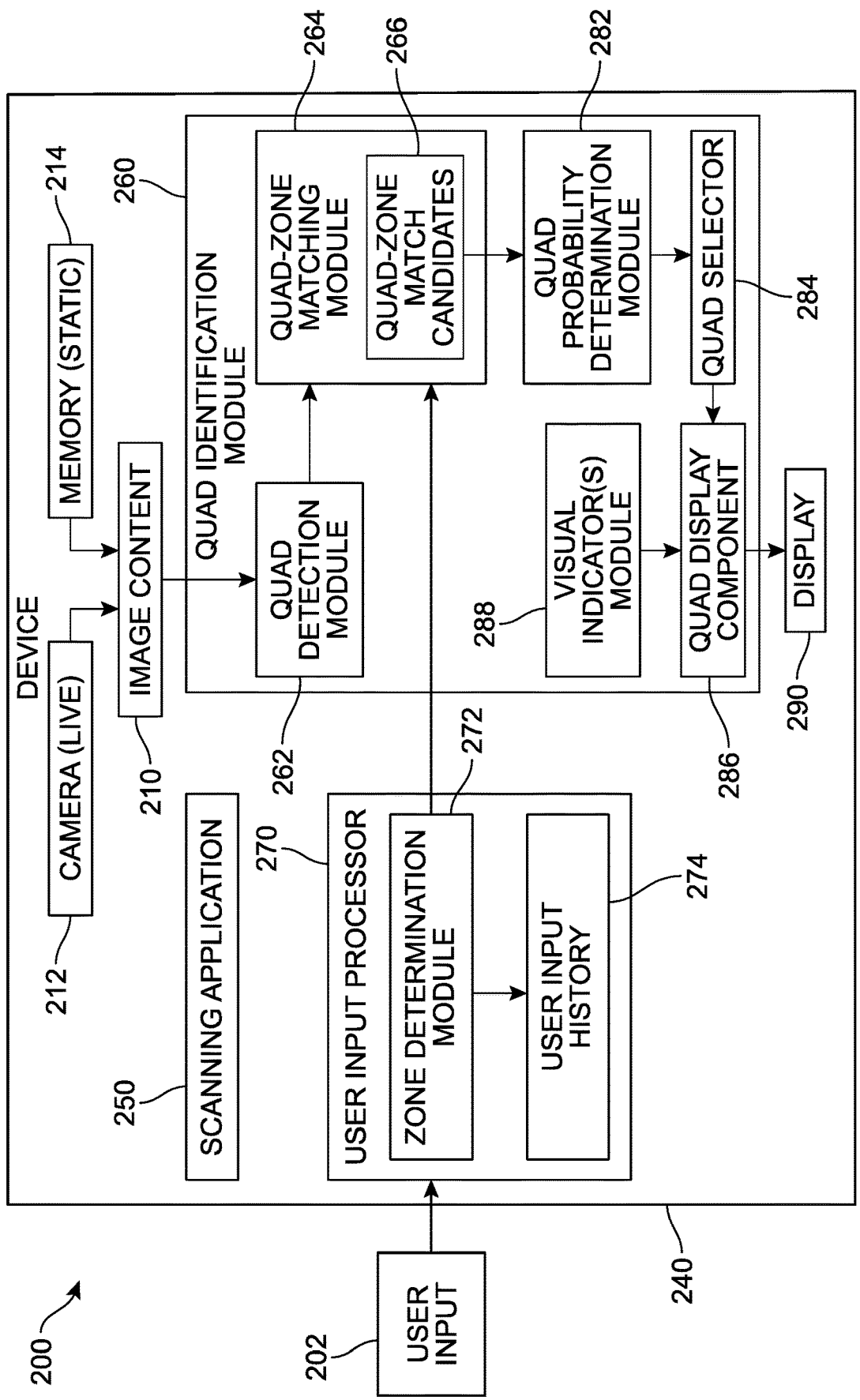
FIG. 2 is a conceptual diagram illustrating one implementation of a distributed computing environment for managing regions in an image for scanning.

In order to better introduce the systems and methods to the reader, FIGS. 1A and 1B presents an example of a representative region selection and detection scanning environment for implementing a multi-region scanning system (the system is illustrated schematically in greater detail in FIG. 2). In different implementations, the environment can include a plurality of computing device end-users, or simply "users" who can capture, view, edit, and/or modify the image (for example a first user, a second user, a third user, etc.). One or more users can interact with or manipulate the image presented via a user device. As users view an electronic content such as an image, various regions of the image may be detected or otherwise identified as being potentially scannable. In one implementation, a user may view or be presented with multiple regions in a single image.

In FIGS. 1A and 1B, a user 102 holds a device 150 in which an image 100 is presented on a display 120 via an image scanning application. The image 100 can include any type of digital media file, as described above. In this example, image 100 is a digital image that includes a plurality of image sectors 160. An image sector may be understood to refer to a potential or possible scannable region. Each sector is represented here by a small rectangular shape (quadrangle or "quad"). However, in other implementations, the sector may be defined by other regular shapes, such as triangles, circles, pentagons, and different geometric outlines, or other irregular shapes. While only five sectors are depicted for purposes of this example, an image can include any number of sectors. In addition, for purposes of simplicity in this case, each sector or quad corresponds to a separate item in the real-world.

An "interface" will be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, such as a finger tap, keyboard command, voice command, or mouse-click, which can trigger a change in the display of the application.

In this example, there are five items that can be distinguished in the display 120 of the device 150 in FIGS. 1A and 1B. The display 120 can be configured to receive data from the camera associated with the device 150 in a live preview and present the items or objects in the camera's field of view through an image capture or image scanning application. In some implementations, the application can provide or present a graphical user interface, herein referred to as an image content scanning interface ("interface"). In some implementations, the interface can be presented 'full-screen' on the display 120 or on only a portion of the display 120 and/or the interface may be substantially transparent, such that interactions with the screen or image are received by the application while the image itself remains fully visible without superimposition of additional interface graphics that would otherwise obstruct the view of the image. However, in other implementations, the application can present a variety of graphical elements in association with, overlaid on, or adjacent to the image, such as a menu, settings, or other options.

Furthermore, the application can incorporate the functionality of the device 150 to implement camera-based scanning techniques that are described herein. The interface 190 is illustrated as a viewfinder that can present current images from the camera and/or switch to present a captured image (i.e., from memory) when a picture has been taken or is being accessed from storage. In addition, in some implementations, a user may be able to modify and/or select portions of a captured image through interaction with the viewfinder portion of the display 120.

In some other implementations, the interface 190 can be configured to display or present various indicators to guide a user to any scannable regions detected in the image. For example, the interface 190 may be configured to display or present a menu, symbols, or other actuatable options that can permit a user to easily navigate through any detected scannable regions and/or simply alert a user that multiple or alternative scannable regions are available in the same image. In some implementations, the detected regions can be highlighted or presented in order of a statistical probability that the targeted region is the scannable region that is desired by the user. However, in other implementations, the application may only detect a first region and only search and/or detect alternative (second) regions if the user subsequently provides some sort of input that corresponds to a request for detection of other region(s).

In FIGS. 1A and 1B, each sector is associated with or corresponds to a particular feature, object, or area in a real-world scene 130. The real-world scene 130 in this example includes a book 132 and a pencil 134 on a table 136. However, the camera in device 150 is positioned or directed such that the only a portion of the available real-world scene 130 is presented on the display 120 in the 'preview' mode. Thus, image 100 can be understood to correspond to a sub-scene of the larger scene 130 that, in this case, includes a page 138 of the book 132, and various content of the page 138. In this example, the various content of the page 138 includes a first illustration 172, a second illustration 174, a third illustration 176, a fourth illustration 178, and a fifth illustration 180. Each of the designated sectors 160 of the image 100 identified above corresponds to an individual illustration on the page 138 for purposes of simplicity. However, it should be understood that in other implementations, there may be other types of regions, there may be greater complexity in the boundary of a detected region, and/or there may be overlap between potentially detectable regions.

In FIG. 1A, the user 102 is being presented with the display 120 where a first region 162 (corresponding to the first illustration 172) has been automatically detected (as represented by a bold line surrounding the boundary of the first region 162). In some implementations, the boundary associated with the detected region is highlighted or otherwise differentiated to inform a user of the region that has been detected and is currently selected. However, it may be appreciated that in many cases, a user may desire the selection of a different, second region associated with any of the remaining items such as second illustration 174, third illustration 176, fourth illustration 178, and/or fifth illustration 180. In different implementations, the system can include provisions to receive input from a user that indicates which region had been actually desired or is the 'correct' region.

As an example, in FIG. 1B the user has touched a portion ("zone") 122 of the image 100 shown on display 120. This input is received by the application as an indication that the user's target region includes what is visible or is being displayed in the zone 122. As a result, the system can detect whether there are any other possible scannable regions and further determine which one(s) include the zone 122. In this case, the application detects a second region 164 that includes the zone 122, and highlights the second region 164 to indicate its selection for scanning to the user. In some implementations, the first region 162 may also be deselected, such that only one scannable region is selected at one time. However, in other implementations, the first region 162 and the second region 164 (and additional regions) may be selected simultaneously for scanning. This can greatly decrease the time needed to collect desired content from an image. Rather than requiring a user to re-take a photo, crop the photo, zoom-in, focus, adjust lighting conditions, increase contrast, or manipulate other image parameters in attempts to 'coax' the application to detect the desired region, the user is able to simply touch (or otherwise interact with) any portion of the image that is included in the desired region and the application automatically detects the correct region.

Referring now to FIG. 2, an example of a representative architecture of a multi-region detection scanning system ("system") 200 is depicted. In different implementations, the system 200 can be configured to present user interfaces for display of electronic content and identification of scannable regions. The system 200 can be further configured to update the selected region based on user input. It is to be understood that the system 200 presented here is merely an example implementation, only some aspects are presented for purposes off clarity, and that a wide variety of other implementations are possible.

In FIG. 2, the system 200 includes a device 240. The device 240 can include any type of device capable of presenting image and/or image-related content, such as cameras, mobile phones, tablets, laptops, desktops, gaming devices, projectors, and other such devices. The device 240 can include a wide variety of hardware and software components. While a scanning application 250 is illustrated as being locally installed on the device 240 in this example, in other implementations, some or all aspects or features of the scanning application 250 may be accessed from another device or accessed from cloud storage computing services.

The scanning application 250 is configured to receive image content 210 via the device 240. The image content 210 may have been previously captured or 'static'—accessed from a memory 214 (local, external, or cloud-based memory)—or can be 'live' and currently being viewed or captured in real-time. The image content 210 can be received by the scanning application 250 via a quad identification module 260, which is configured to process the data of image content 210 and detect portions of the image that correspond to approximately or substantially quadrangular-shaped objects. In particular, the quad detection module 262 can be configured to identify quadrangles within the image that can be characterized as potential regions for scanning. These quadrangles can be detected using a variety of feature extraction techniques suitable to find arbitrary shapes within images and other documents.

In different implementations, the device 240 is further configured to receive user input 202 via a user input processor 270. The user input 202 can vary widely based on the type of input means used. In FIG. 2, the user input 202 can be understood to be associated or correspond with some specific target portion or aspect of the image that is being viewed or accessed by the user. In one implementation, the user input processor 270 can store the user input 202 in some form in a user input history component 274 for later reference (see FIGS. 10A-10G). As one example, the user input can include a touch on a touch-screen interface or a mouse-click designating a target zone in the image that is desired by the user for inclusion in the scanned region.

In some implementations, the user input 202 can be processed by a zone determination module 272 that is configured to receive and evaluate the input in relation to the device display, and determine which portion (zone) of the display has been targeted or selected by the user input. A quad-zone matching module 264 can receive the information generated by both the zone determination module 272 and the quad detection module 262 in order to determine whether and which of the detected quads include the zone that has been identified by the zone determination module 272. Any quads that are classified as including the targeted zone can be collected and stored by a quad-zone match candidate module 266.

In different implementations, particularly in cases where the quad-zone matching module 264 determines that there are multiple quad candidates that include the targeted zone, the quad identification module 260 can be configured to assess which quad(s) have the highest likelihood of representing or corresponding to the desired scanning region in the image. This determination can be based on a variety of factors, including the user input, the image content, previous inputs, image characteristics, and the confidence associated with each edge or vertex that has been detected in the image and is classified as a quad-zone match. If there is only one quad that qualified as a quad-zone match candidate, this quad will be automatically selected by quad selector 284. However, if multiple potential quads are identified, a quad probability determination module 282 can evaluate each potential candidate quad and estimate which is most likely to represent the intended scan region. The quad selector 284 receives this candidate and submits it to a quad display component 286. The display connected to the device 240 can receive the information generated by the quad display component 290 and present the quad to the user, overlaid or superimposed on the image content 210. In some implementations, the quad display component 286 can access various graphical elements from a visual indicator module 268. In cases where additional user interface elements are requested or required, they may also be superimposed or overlaid on the image content being presented on the display 290.

Figure 3:
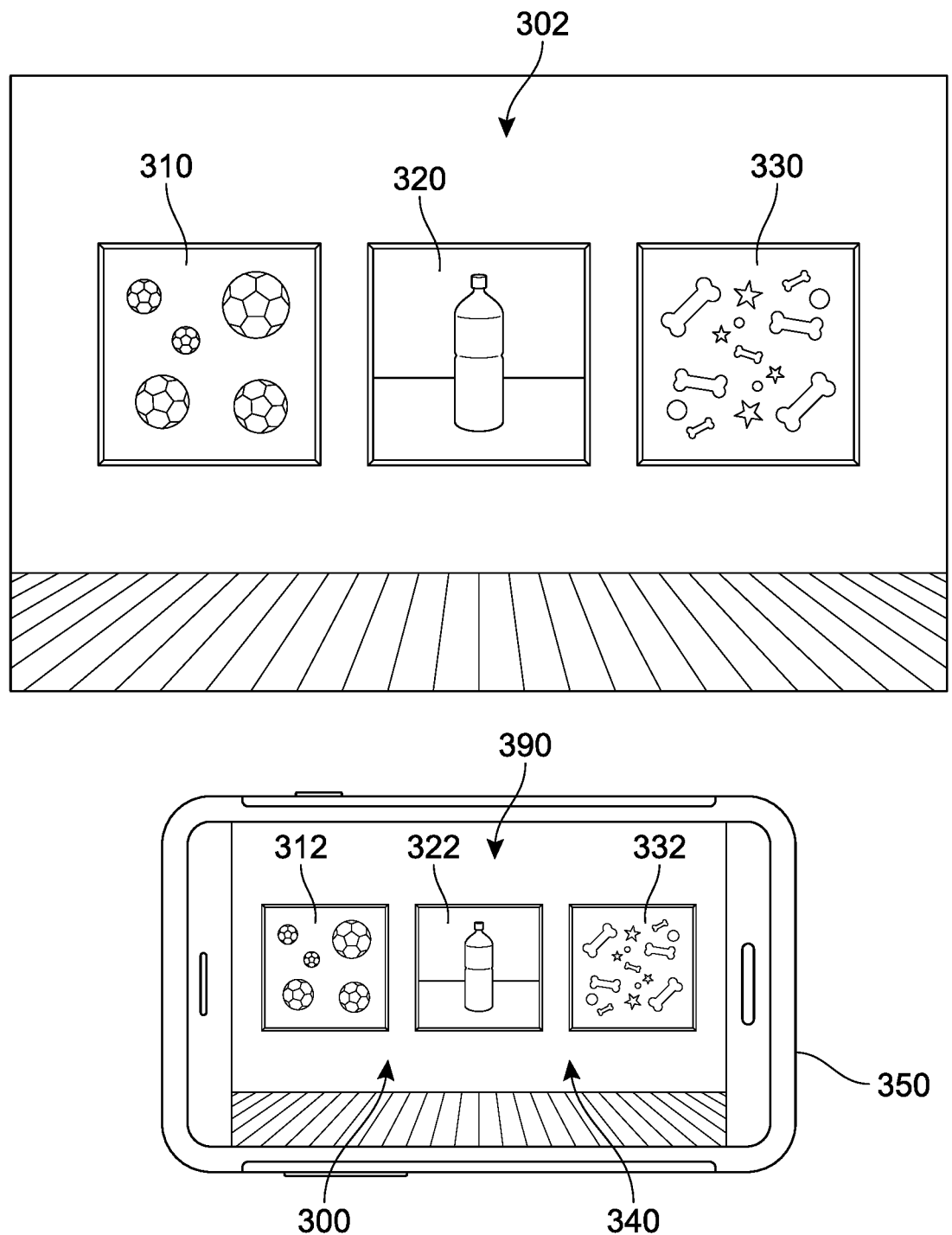
FIG. 3 is a display diagram illustrating an implementation of a user interface for an application configured to provide scanning tools and a real-world setting.

For purposes of clarity, one implementation of a scannable region selection process will be presented now with reference to FIGS. 3-6. In FIG. 3, an image scanning application ("application") 300 is depicted, represented by a graphical user interface (GUI) shown on a display 390. In different implementations, the application 300 is used to initiate display of the GUI and various user interface elements, features, and controls to facilitate capturing images via a camera (not illustrated), scanning, and/or processing of images.

In some implementations, a user can initiate a scan by viewing or capturing a real-world scene (e.g., taking a picture or photograph), by capturing or viewing an image that can include virtually-generated objects (e.g., screenshots or snipping tool), or by loading any previously captured or saved image for viewing via or in conjunction with the application. For example, subjects can include one or more quadrangular objects, such as one or more of a document, paper, business card, photo, whiteboard, checks, artwork, persons, and other such objects. It may be appreciated that application 300 is most commonly implemented to detect portions of an image that correspond to substantially rectangular objects.

As noted earlier, in some implementations, the application 300 can be configured to detect and/or identify quadrangles within an image that may qualify as potential regions for scanning. These may also be referred to as quadrangular regions. Quadrangles within an image can be identified using a variety of feature extraction techniques suitable to find arbitrary shapes within images and other documents. In other words, in some implementations, the application can be configured to detect portions of the viewed image that substantially correspond to four-sided shapes or objects. In particular, the application can be configured to identify quadrangles within the captured image that may be potential regions for scanning.

In some implementations, the application 300 includes or otherwise makes use of an edge detector operable to detect edges based upon visual differences, such as sharp changes in brightness. When edges have been identified, the edges may be joined into connected lines to form a perimeter that has a quadrangular shape. For example, vertices (corners) can be identified through an edge detection mechanism, and these vertices can be connected or mapped to form quadrangles. As a result, a set of potential quadrangular regions can be derived based on the detected edges and lines, where the lines are detected from similarly-oriented edges along a particular direction and are then combined to form the quadrangles.

An example of this mechanism is presented in FIG. 3, where the GUI is overlaid on a display of a real-time image capture of a real-world scene 302 by the camera connected to or integrated in device 350 (here represented as a mobile phone). In FIG. 3, the real-world scene 302 is an art gallery in which several pieces of art are secured along a wall, including a first object 310, a second object 320, and a third object 330, here arranged near one another. A portion of the gallery including a section of the gallery wall is being captured by the camera of device 350, and is viewable on the display 390 as a first image 340. The first image 340 can be a digital representation that includes first subject 312 (corresponding to the first object 310), a second subject 322 (corresponding to the second object 320), and a third subject 332 (corresponding to the third object 330). In the implementation of FIG. 3, the application 300 is in a passive mode, in which an image is viewed but no scanning or region-detection is occurring.

In different implementations, once the scan or region detection feature of application 300 has been activated or initiated, the application 300 can be configured to automatically detect a region for scanning in the image. However, it should be understood that in other implementations, the application may not require any transition between a passive mode and an active mode and may instead be configured to detect regions for scanning as soon as an image viewing is initiated.

Figure 4:
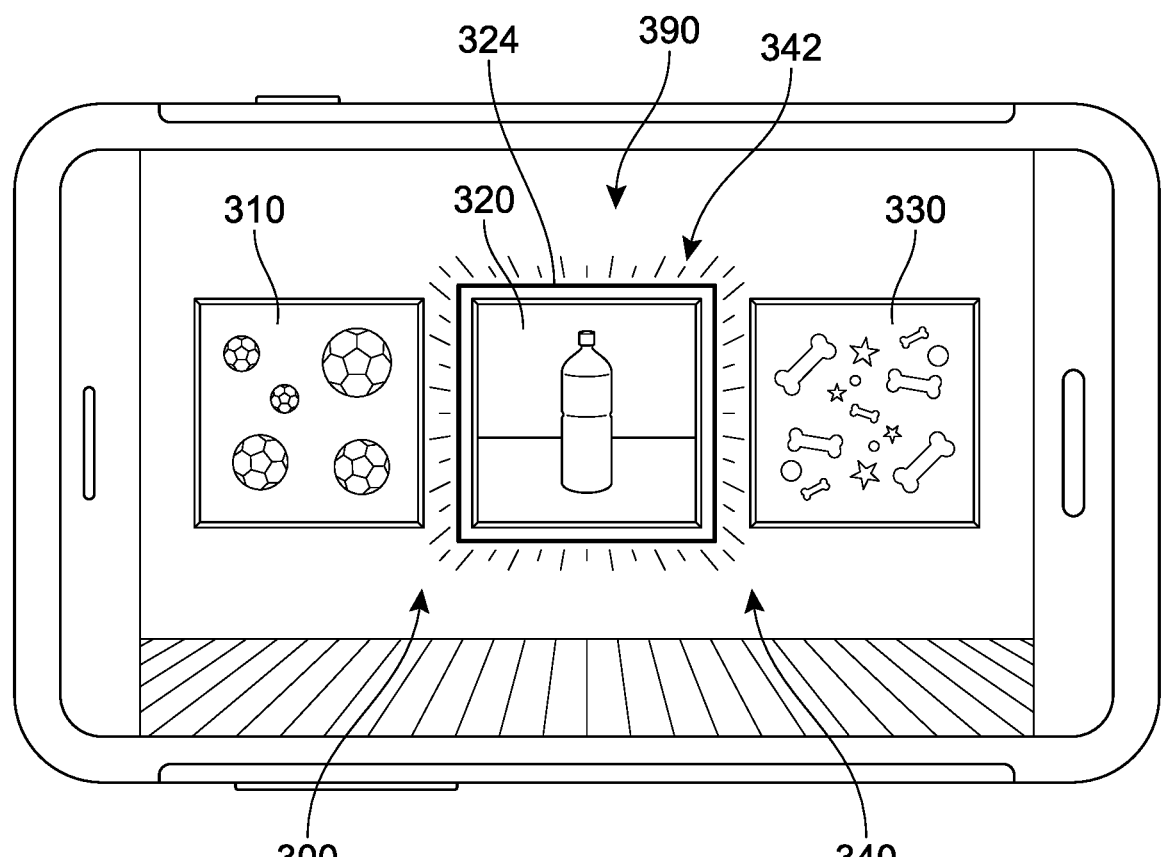
FIG. 4 is a display diagram illustrating an implementation of a user interface for an application configured to provide scanning tools with a first region in an image selected.

In FIG. 4, the first image 340 is displayed on the device 350, and the scanning operation of the application 300 has been activated. The display 390 in FIG. 4 further includes an indicator 342 that is associated with or surrounding a first perimeter 324 of the second subject 322. The indicator 342 can indicate to a user that a candidate region has been detected, and/or emphasize the region's boundaries. Such indicators may appear in the user interface to help distinguish or highlight quadrangles that are detected and/or have been selected within a captured image.

The indicator can vary in different implementations, and can include various effects, such as blinking, changes in luminosity, superimposition of graphical elements along portions of the detected region, flashing, animated lines, color changes, flags, graphical elements such as points or circles at each vertex and dashed or solid lines appearing along edges, or other such visual indicators. For example, in FIG. 4 the indicator 342 includes an increased brightness that substantially surrounds the second subject 322.

It may be appreciated that in many cases, a first detected region that is identified by the application 300 as a potential scanning candidate may not correspond to the region that was specifically desired for scanning by the user, or that this first detected region may be only one region of many that a user intended to scan. In different implementations, a user can provide an input signal that can be used by the application 300 to refine or improve the region detection process. This signal can vary, but can include a user input that designates another (second, third, etc.) different portion or zone of the display that is located within the boundaries of the region desired by the user for scanning. In one implementation, upon receiving a user input indicating one or more particular sets of pixel coordinates, the application 300 can be configured to detect only those region(s) in the image that contain or include the one or more designated coordinates.

Figure 5A:
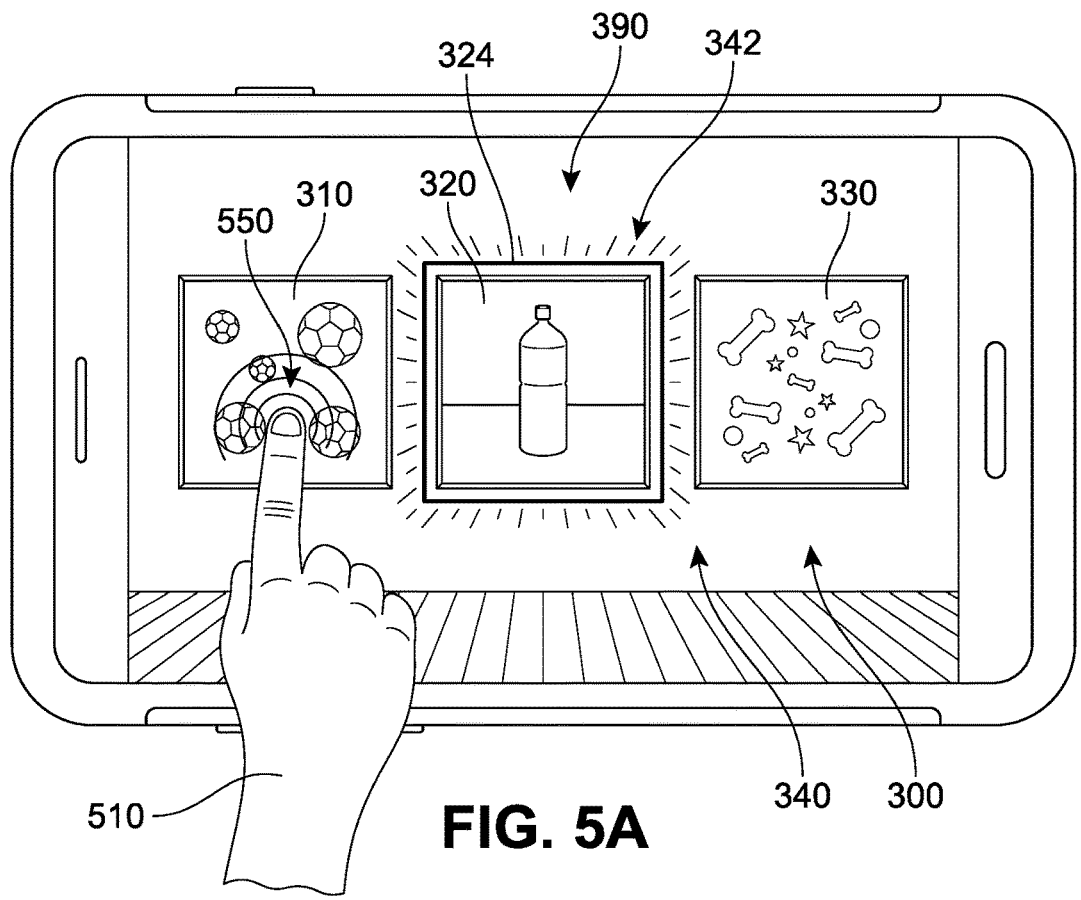
FIGS. 5A and 5B are display diagrams illustrating an implementation of a user interface for an application configured to provide scanning tools where a first user input causes a second, different region in the image to be selected.
Figure 5B:
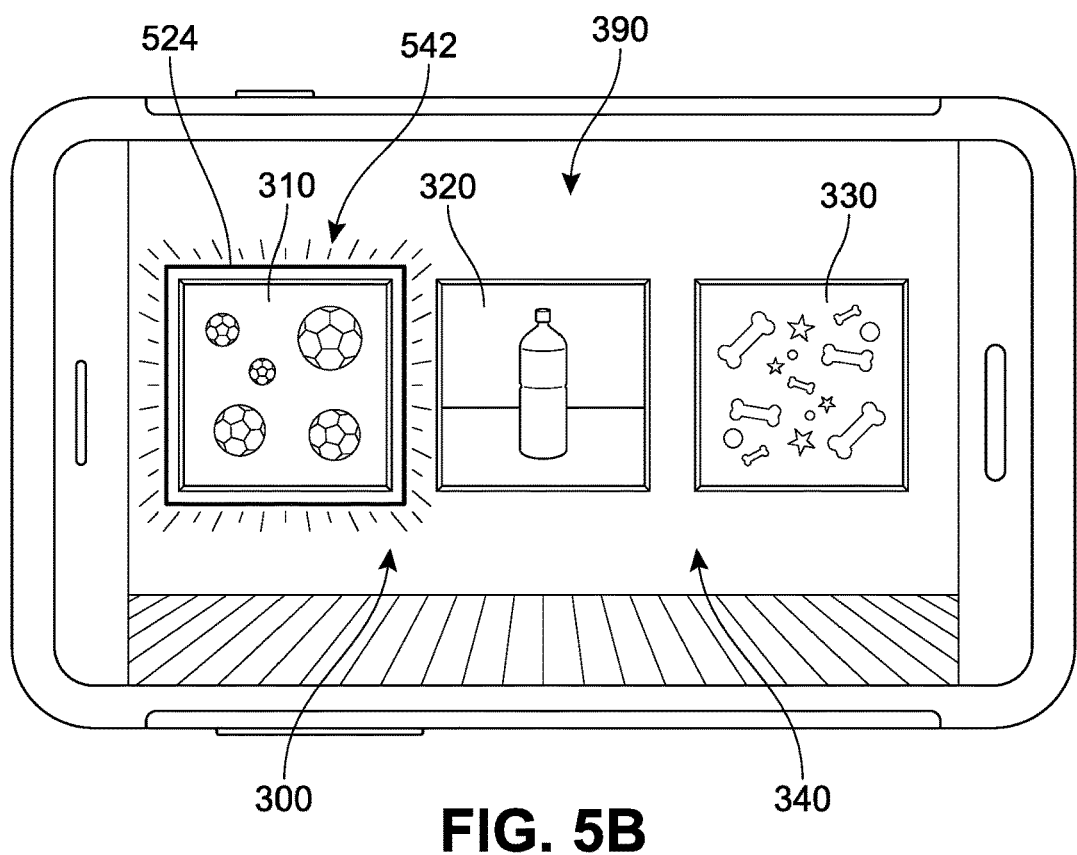

One example of this feature is depicted in the sequence of FIGS. 5A and 5B. In FIG. 5A, the second subject 322 is still highlighted or remains selected for scanning. However, a user (represented by a hand 510) is shown interacting with display 390. In this case, the user taps or contacts the display 390 (represented in this figure by a series of radiating concentric arcs) at a first zone 550 of the display 390, where it is understood that the first zone 550 is included, disposed, or located in the user's desired region. In response, the application 300 may automatically initiate a search or detection of quadrangular regions that include at least the first zone 550.

In different implementations, the application 300 may be configured to detect one or more regions that include the targeted area corresponding to first zone 550 and present these candidate region(s) to a user. In FIG. 5B, the first subject 312 with a second perimeter 524 is now presented as a potential candidate for scanning (as represented by an indicator 542), rather than the second subject 322. However, in other implementations, the previously detected regions (scan candidates) may remain selected, such that a user may select and compile a plurality of discrete regions in a single image for scanning.

Figure 6A:
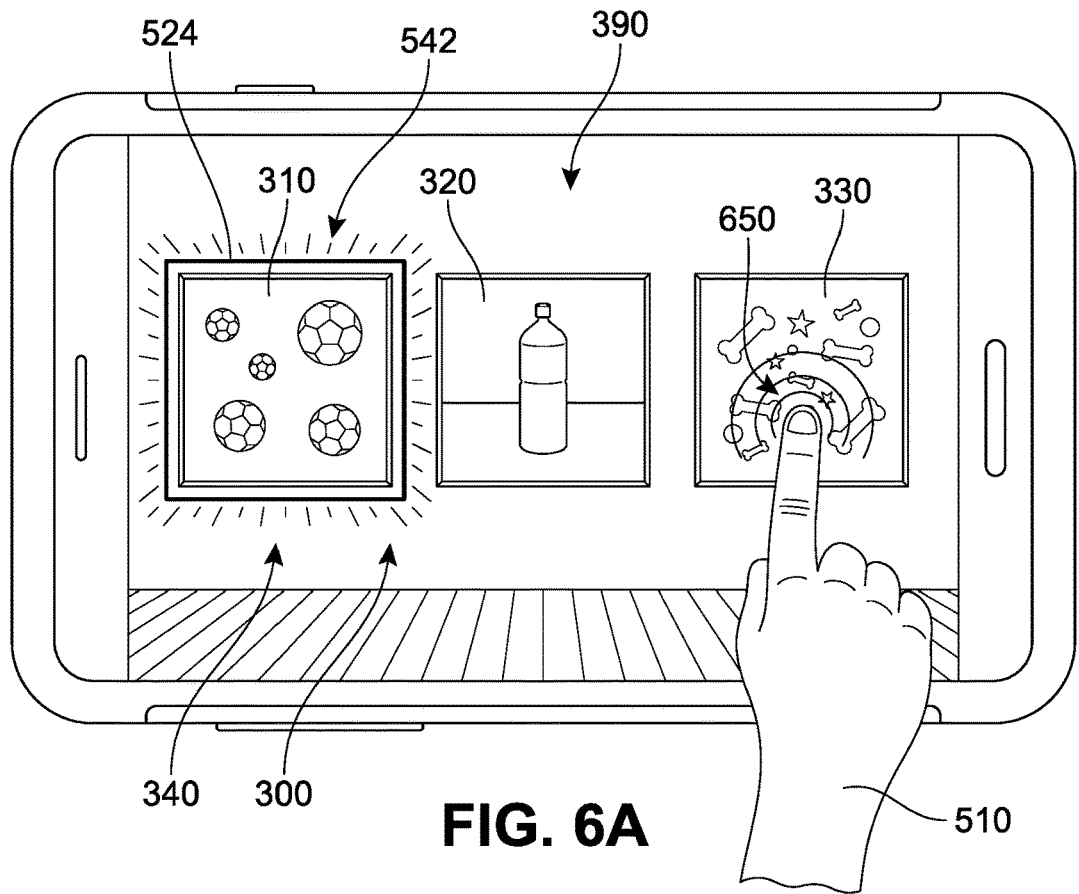
FIGS. 6A and 6B are display diagrams illustrating an implementation of a user interface for an application configured to provide scanning tools where a second user input causes a third, different region in the image to be selected.
Figure 6B:
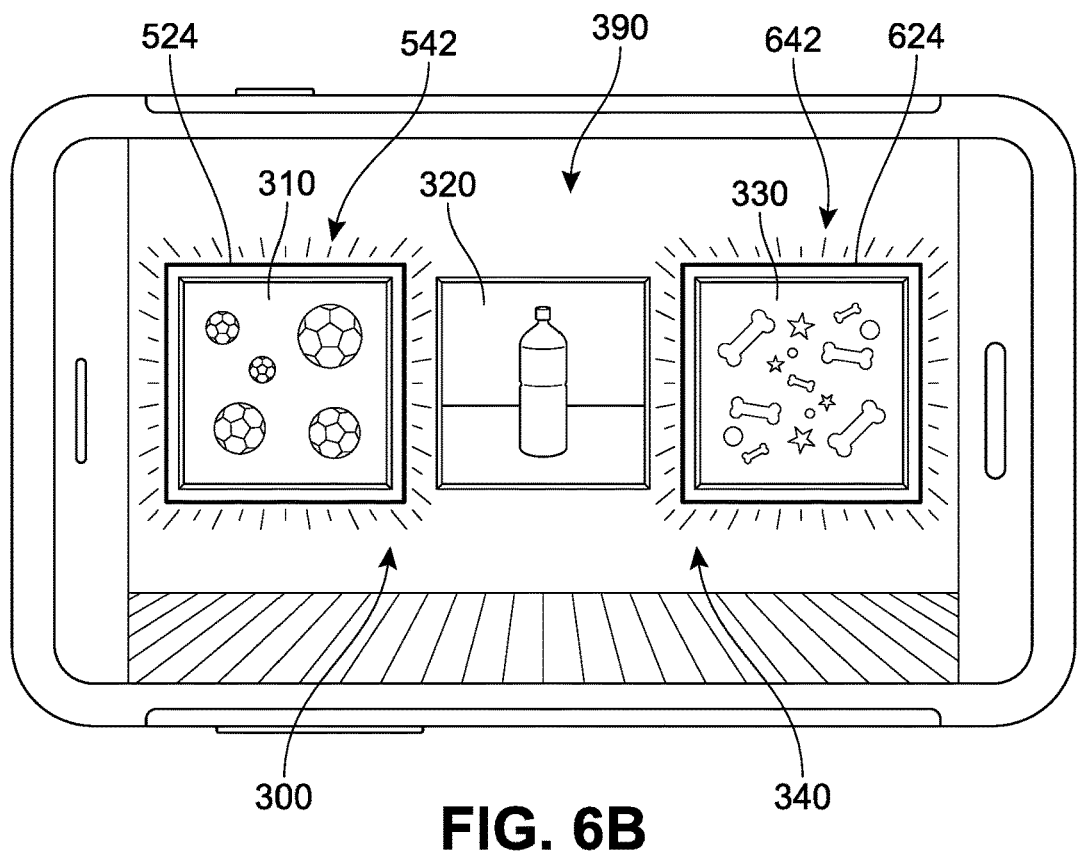

One implementation of such a multi-region selecting tool is illustrated in the sequence of FIGS. 6A and 6B. In this example, the application 300 is in active mode, and the first subject 312 has been highlighted as a scannable candidate region by indicator 542 (similar to the illustration of FIG. 5B). However, a user (represented by hand 510) is now shown interacting with display 390. In this case, the user taps or contacts the display 390 (see radiating concentric arcs) at a second zone 650 of the display 390, where it is understood that the second zone 650 is included, disposed, or located in the user's desired region. In response, the application 300 may automatically initiate a search or detection of quadrangular regions that include at least the second zone 650.

In different implementations, the application 300 may be configured to detect one or more regions that include the area in the second zone 650. In FIG. 6B, third subject 332 with a third perimeter 624 is now presented as a potential candidate for scanning (as represented by an indicator 642) while the second subject 322 remains selected as well In other words, the scanning interface can include provisions for input by a user to facilitate the selection of multiple regions for scanning. In some implementations, this can occur during a multi-region selection mode or option that is available via a menu or settings option associated with the application. In other implementations, various commands or shortcuts (e.g., the duration of contact between a finger-tap and the screen, keyboard command, a double-tap, a swipe, etc.) can be interpreted by the application as instructions to switch between a single-region selection mode (see FIGS. 5A and 5B) and a multi-region selection mode (see FIGS. 6A and 6B). In different implementations, the selection of multiple regions can be compiled such that they are each scanned in the order the selection occurred, allowing a user to easily prioritize or organize scanned items from a single image.

It should be understood that alongside the tools described herein, other scanning features can remain available to users while using the application. For example, in some implementations, the various indicators may be selectable by the user to permit adjustments to a selected quadrangle, such as by dragging of a corner to reposition the corner. As another example, a user may define a custom quadrangle by selecting one corner through interaction with the user interface and the application can in some cases automatically derive a corresponding quadrangle based upon the user selection of the specified corner. The user may also be able to apply a select and drag tool with the user interface to more directly identify an area for selection (e.g., custom quadrangles).

Figure 7:
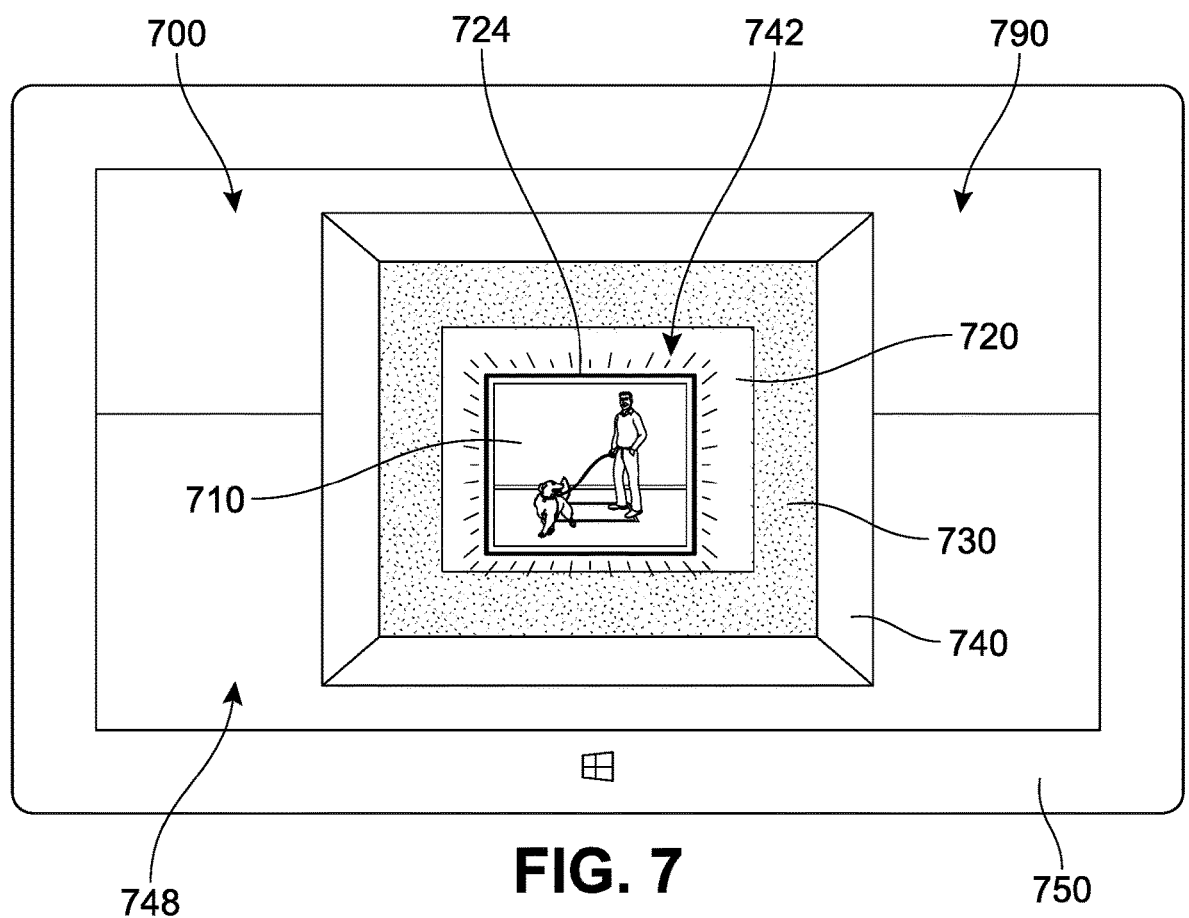
FIG. 7 is a display diagram illustrating an implementation of a user interface for an application configured to provide scanning tools with a first region in the image selected.

As noted earlier, in some implementations, a region candidate may overlap with another region candidate that contains or includes the pixel coordinates designated by the user input. Referring now to FIG. 7, one example of such a scenario is presented. In FIG. 7, an image scanning application ("application") 700 is depicted, represented by a graphical user interface (GUI) shown on a display 790. In different implementations, the application 700 is used to facilitate capturing images via a camera (not illustrated), scanning, and/or processing of images.

As described above with respect to FIG. 3, a user can initiate a scan by viewing or capturing a real-world scene (e.g., by taking a picture or photograph), by capturing or viewing an image that can include virtually-generated objects (e.g., screenshots or snipping tool), or by loading any previously captured or saved image for viewing in the application. In this example, a user is viewing a previously captured (saved) second image 748. Thus, in this case, a substantially transparent GUI is integrated or overlaid with the presentation of a static image on a display 790 of a device 750 (here represented as a tablet) that includes a plurality of real-world objects corresponding to subjects in the displayed image. In FIG. 7, the static image includes a photograph 710 substantially surrounded or enclosed by a first border mat 720. In addition, the first border mat 720 (as well as the photograph 710 disposed or arranged within an interior space bounded by the first border mat 720) are further substantially surrounded or enclosed by a second border mat 730. In other words, the first border mat 720 and photograph 710 are disposed in an interior space bounded by the second border mat 730. Furthermore, a frame 740 substantially surrounds or encloses the second border mat 730.

While each object identified here (photograph 710, first border mat 720, second border mat 730, and frame 740) is arranged in a substantially concentric arrangement relative to one another for purposes of simplicity, it should be understood that the tools described herein can be applicable to scenes in which regions do not enclose or surround one another but can extend to any image in which there are two or more regions that overlap, share, or include at least one set of the same pixel coordinates. In FIG. 7, the application 700 automatically presents a first candidate region with a first perimeter 724 for scanning, which in this case encompasses photograph 710, as designated by indicator 742. Although the smallest or centermost region is initially presented in FIG. 7, it should be understood that in other implementations, any other region may be automatically presented as a result of algorithm(s) that may applied to the image.

However, as noted above, a first detected region candidate initially or otherwise identified by an application as a potential scanning candidate may not correspond to a region that is of interest or that was desired for scanning by the user, or a may be only one region of multiple regions within the image desired for scanning. In some implementations, a user can input a signal that can be used by the application 700 to fine-tune the region detection process.

Figure 8A:
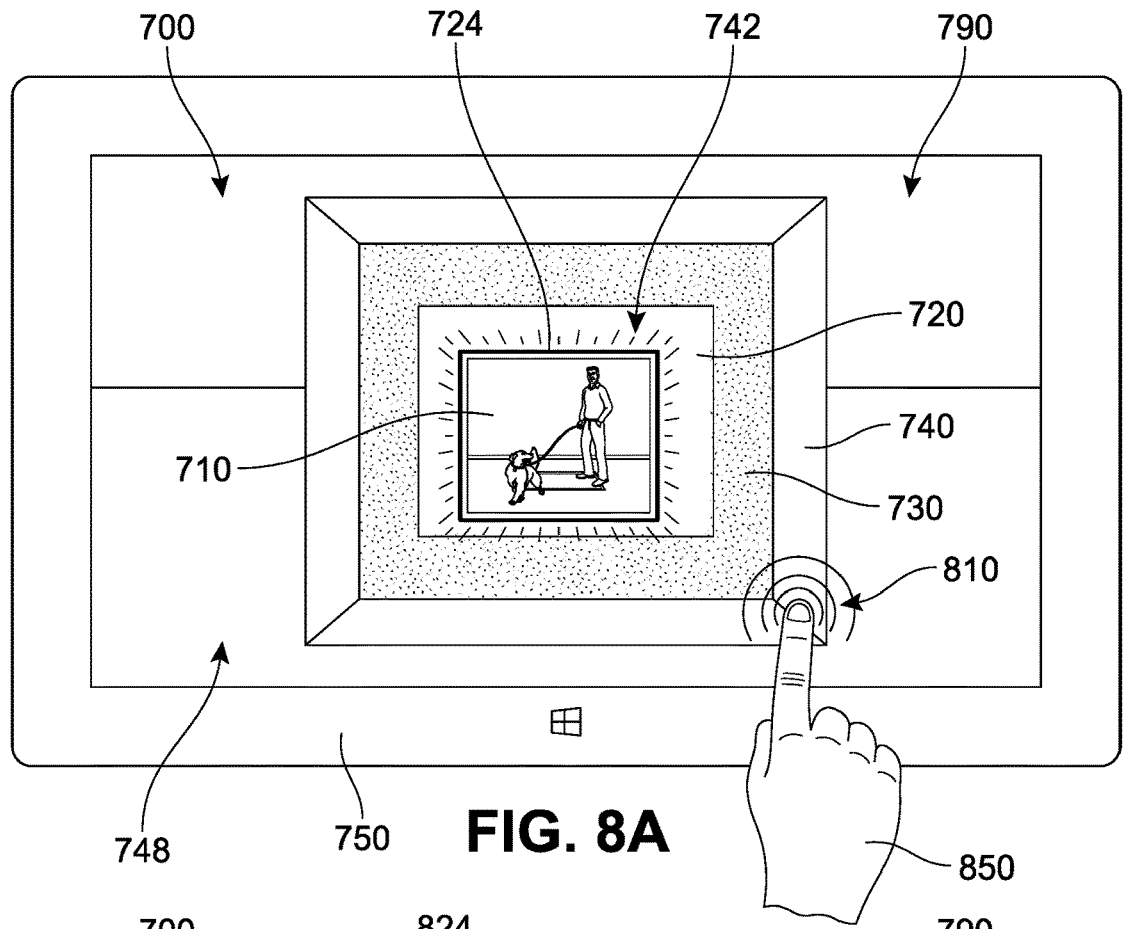
FIGS. 8A and 8B are display diagrams illustrating an implementation of a user interface for an application configured to provide scanning tools where a first user input causes a second, different region in the image to be selected that includes the first region.
Figure 8B:
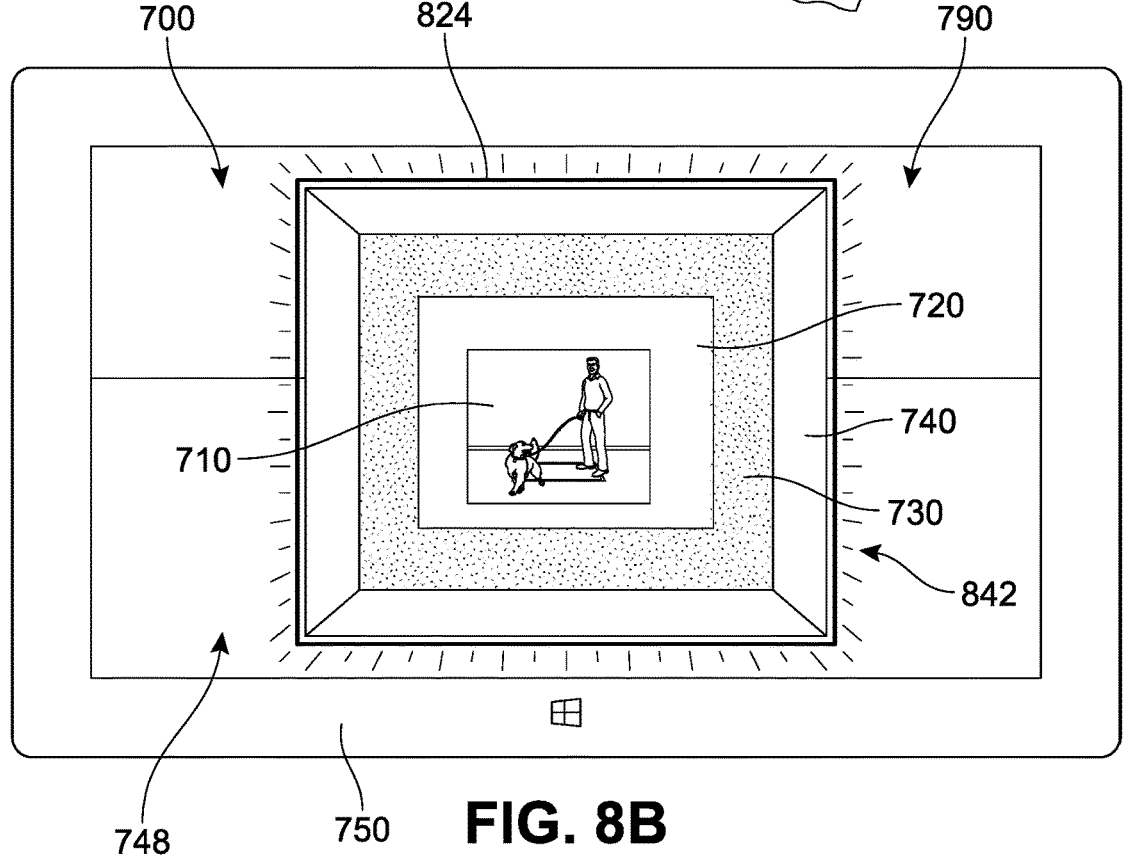

Referring to FIG. 8A, in some implementations, a user may interact with the application 700 via a touch-screen input mechanism, and indicate by touch (see concentric arcs proximate to a hand 850) that the region of interest includes a first set of coordinates or location ("first zone") 810. The application 700 can receive this input and in response re-run or re-initiate the quad detection process, where the process is now limited to detection of only those quads that include the designated first zone 810. In other words, the application 700 may automatically initiate a new search for quadrangular regions that include at least the first zone 810 in response to user input. In FIG. 8B, it can be seen that this process has resulted in the identification of a second region candidate bounded by a second perimeter 824, as designated by an indicator 842. The second candidate region in this case encompasses frame 740 as well as all objects disposed or included within the interior space of the frame (i.e., second border mat 730, first border mat 720, and photograph 710).

Figure 9A:
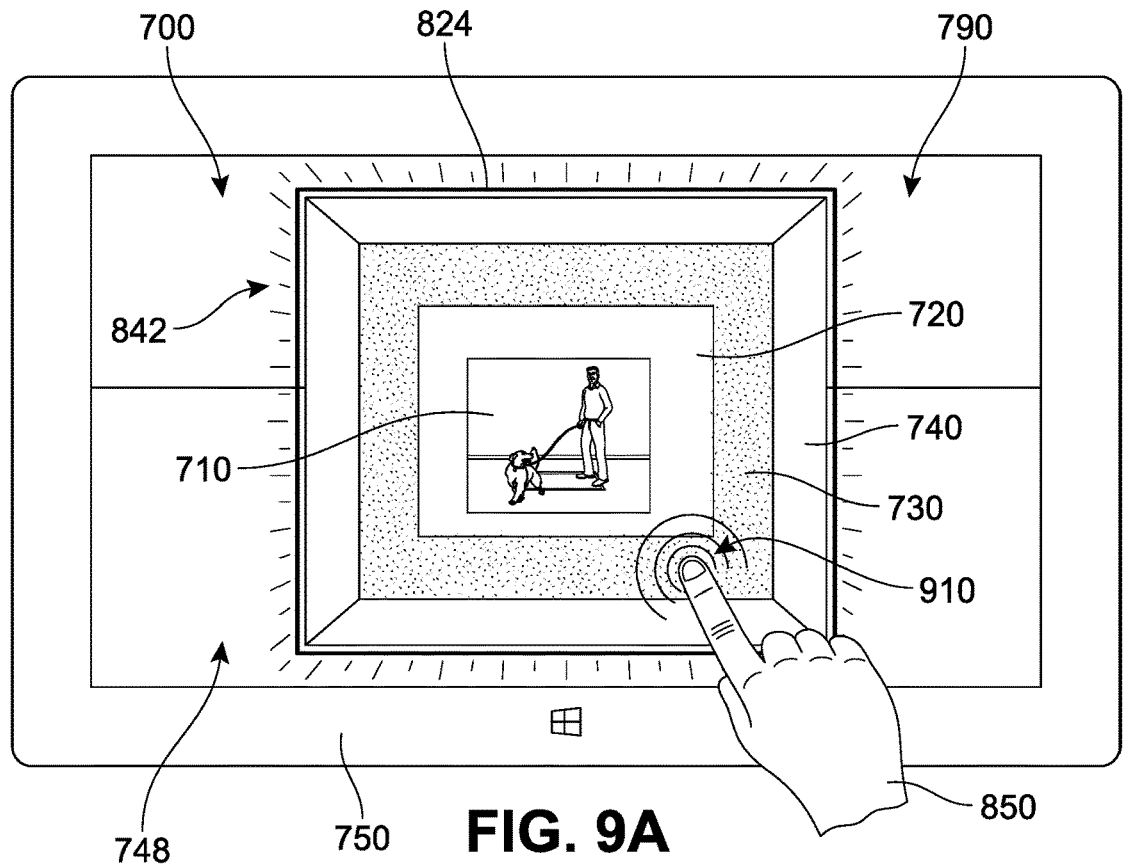
FIGS. 9A and 9B are display diagrams illustrating an implementation of the user interface for the application configured to provide scanning tools where a second user input causes a third, different region in the image to be selected.
Figure 9B:
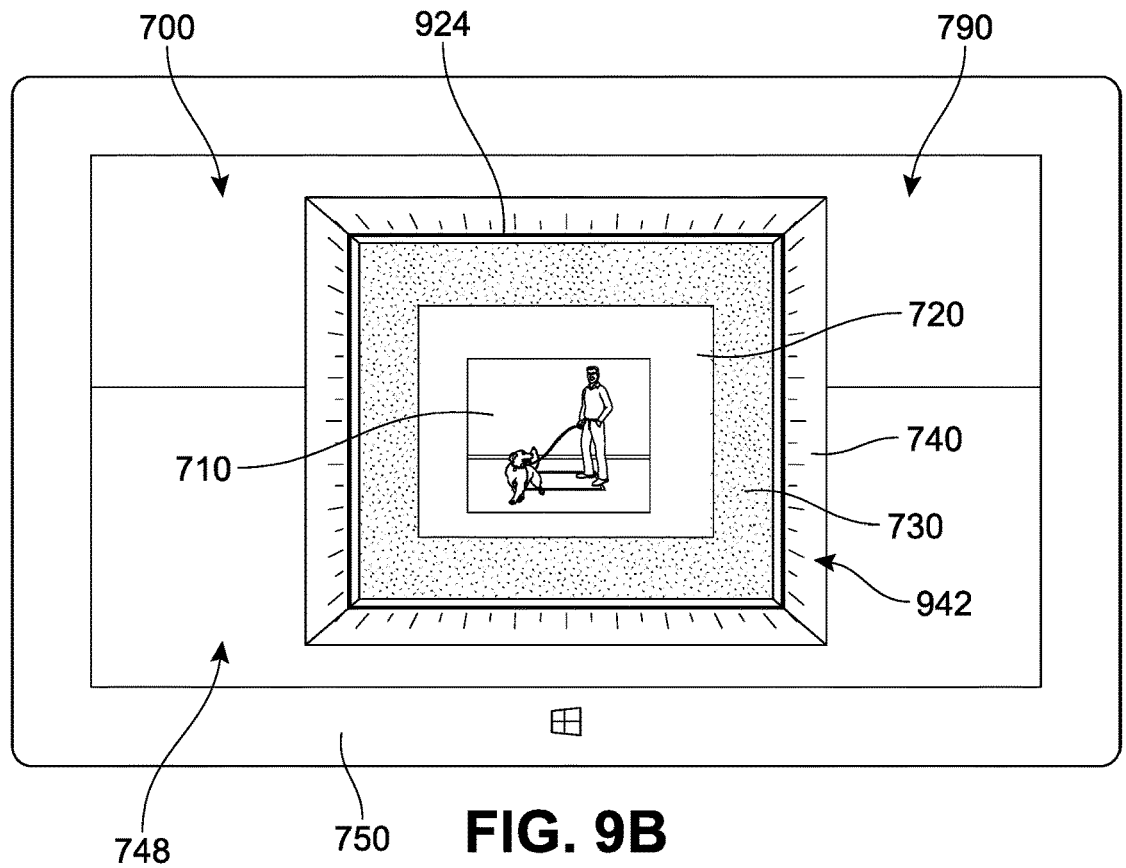

Thus, in the example illustrated between FIGS. 7, 8A, and 8B, the application has switched from a central (inner) quad to an outer (peripheral) quad. In other implementations, the user may instead determine that the region of interest lies between these quads. Referring to FIG. 9A, a user (represented by hand 850) is again interacting with display 790. In this case, the user taps or contacts the display 790 at a second set of coordinates ("second zone") 910 of the display 790, where it is understood that the second zone 910 is included, disposed, or located in the user's desired region. In response, the application 700 may automatically initiate a new search for quadrangular regions that include at least the second zone 910. In FIG. 9B, it can be seen that this process has resulted in the identification of a third candidate region bounded by a third perimeter 924, as designated by an indicator 942. The third candidate region in this case excludes frame 740, and instead only encompasses second border mat 730 as well as all objects disposed or included within the interior space of the second border mat 730 (i.e., first border mat 720 and photograph 710).

It can be noted that in cases where there are multiple quads including the area targeted by the user (e.g., a first zone), the application may detect and present a scanning candidate ("first quadrangular region") that does in fact include the first zone, but still does not correspond to the region that was actually desired for scanning by the user. For example, this may occur while scanning images in which there are two or more overlapping quads. In such cases, the application may be configured to permit a user to repeatedly enter the same or similar input(s). For example, a repeated input corresponding to a designation of the first zone can be submitted by the user. The submission of the same input may be received by the application as a request to search for and detect at least a second (alternate) quadrangular region that also includes the first zone, where the second quadrangular region differs from the first quadrangular region that was identified. This process may be repeated, where a user continues to tap or otherwise designate the coordinates associated with the first zone, until the correct region containing the first zone has been identified.

In different implementations, the application 700 may further be configured to facilitate the selection of regions for scanning that are 'atypical' quadrangles. For example, a user may initially select an outer quadrangle (e.g., frame 740) and retain this selection while adding further quad selections (second region, third region, fourth region, etc.) from within a single image, as discussed above with respect to FIGS. 6A and 6B. However, in cases where a user initially selects a first region and retains the selection, and then selects a second region, the application can be configured to isolate the shape that is contained within or extends between the boundaries of the two selected regions. In other words, if a user selects a first region such as the frame 740 and a second region such as the photograph 710, the application can be configured to interpret the two selections as designating an outer boundary for a third, resultant region that extends between or is enclosed or disposed in the space between the boundaries of the first quadrangle and the second quadrangle (in this case, the frame 740, the second border mat 730, and the first border mat 720, and excluding the photograph 710). Such 'double border' regions can also be referred to as apertured or hollowed quadrangles.

In addition, traditional scanning features can remain available to users while using the application. For example, in some implementations, when multiple regions are chosen by a user, each region may be selectable to allow customization to one or more quadrangles, such as by dragging of a corner to reposition the corner. With respect to the scenario described above, if an apertured quadrangle is selected, the user may customize or adjust the inner border and/or the outer border by selecting a vertex or corner through interaction with the user interface. The application can be configured to automatically derive a corresponding quadrangle based upon the user selection of the specified corner. The user may also be able to apply a select and drag tool with the user interface to more directly identify a boundary for selection (e.g., custom apertured quadrangles).

In different implementations, other tools may be provided through implementation of the disclosed systems. The following process may be useful in images that include clusters of merged or overlapping regions. An example of an alternate scanning application implementation is presented in FIGS. 10A-10G. In FIG. 10A, an illustration of a simplified display is shown with multiple candidate regions identified. For purposes of clarity, only a few regions are shown, and these are each arranged directly adjacent to or merged/adjacent with one another. Specifically, in FIG. 10A, a first region (Region A), a second region (Region B), and a third region (Region C) are labeled for purposes of reference. It can be appreciated that a user may desire a quad that is not any of Regions A, B, or C (as isolated regions), but rather desire a quad region that encompasses or includes two or more of these regions. For example, a fourth region (Region D) can be understood to extend across and include Region A and Region B, a fifth region (Region E) can be understood to extend across and include Region B and Region C, and a sixth region (Region F) can be understood to extend across and include Region A, Region B, and Region C.

Figure 10B:
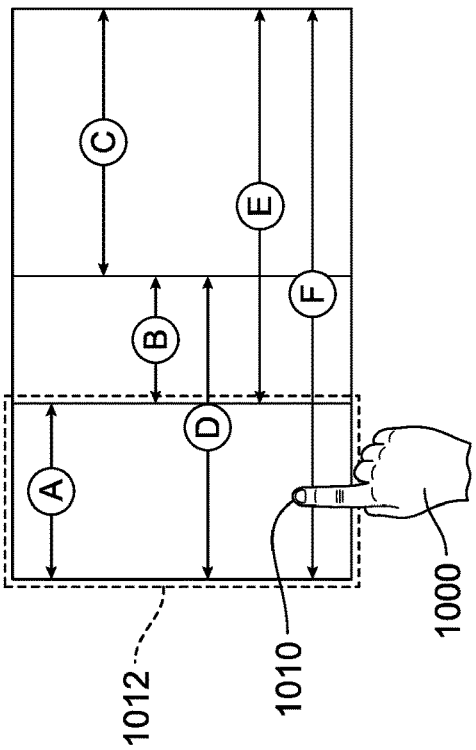

In FIG. 10B, a user (represented by a hand) 1000 is shown providing a first input 1010 associated with a first zone that is located in Region A. In response to receiving the first input 1010, the application can be configured to automatically detect and present Region A (see a first indicator 1012 associated with the perimeter of Region A) as a potential region candidate. In some cases, however, the user 1000 may actually have intended to request a scan of the larger Region D. In such a scenario, rather than dismiss or deselect Region A, and/or attempt to locate a different point (zone) that would trigger the desired quad, the user may simply provide a second input 1020 (see FIG. 10C) that is associated with a second zone in Region D (here also located in Region B). In response to receiving this second input 1020, the application can be configured to automatically detect and present Region D (see a second indicator 1022 associated with the perimeter of Region D). In other words, in some implementations, the application is configured to receive a sequence of two or more different inputs and detect a region for scanning based on the inputs. In response to receiving an input sequence for an image that includes multiple candidate regions directly adjacent to or otherwise sharing at least a portion of the image, the application can be configured to detect and present a resultant larger quad that contains, encompasses, or includes each of the sub-regions designated by the user.

Figure 10D:
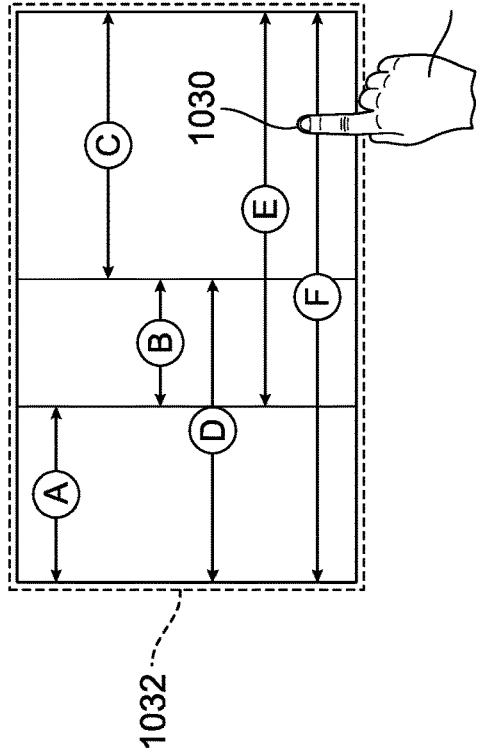
Figure 10A:
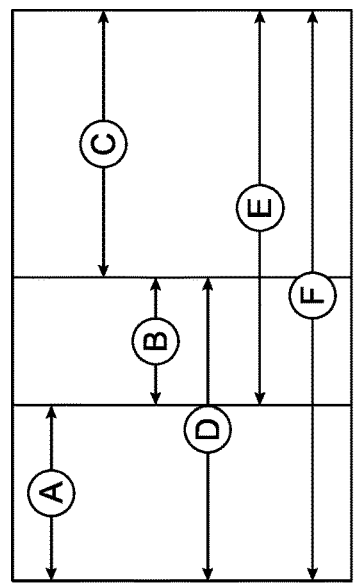
Figure 10C:
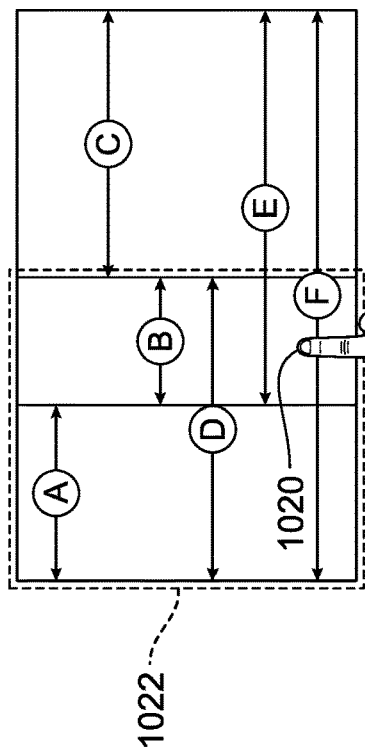

Another example is shown with respect to FIG. 10D, where a user desires a region that includes several 'sub-regions' or quad segments. The larger number of sub-regions can increase the difficulty of quickly and efficiently targeting and/or selecting the desired quad. As shown in FIG. 10D, the user 1000 provides a third input 1030 that is associated with a third zone (here located in Region C). In response to receiving this third input 1030, the application can be configured to automatically detect and present Region F (see a third indicator 1032 associated with the perimeter of Region F). Thus, the application can provide users with an efficient and highly accurate means of selecting their desired scanning region, even in cases where the image or quad includes multiple sub-quads.

In different implementations, a user may input a sequence incorrectly or otherwise change their mind about the region that has been selected for scanning. The process described herein can also be configured to allow a user to 'undo' or modify a selected region for scanning. In FIG. 10E, the user 1000 desires removal or exclusion of the first region (Region A) from the larger Region F of FIG. 10D. In this case, the user 1000 can submit or provide a fourth input 1040 that is associated with any area or portion (including the first zone) located in Region A. This input may simply include a single tap, similar to the input previously provided to select the region. Thus, when a region has been previously selected and then is re-selected, or an input associated with a highlighted region is received (fourth input 1040) the application can be configured to automatically detect and remove the designated region, while maintaining a selection of the other regions, as represented by a fourth indicator 1042 associated with the perimeter of Region E). In other words, in some implementations, the application is configured to receive a sequence of two or more inputs. In response to receiving a specific input sequence for images that include multiple candidate regions directly adjacent to or otherwise sharing at least a portion of the image, the application can be configured to detect an input for a region previously selected and remove or excise that region from the current scanning selection.

Similarly, a user may wish to isolate or target a region for scanning that is currently included as part of a unified or continuous larger quad selection. In FIG. 10F, the user 1000 is shown submitting a fifth input 1050 that is associated with an area or portion (including the third zone) located in Region C. This input may simply include a single tap, similar to the input previously provided to select the region. In this example, the application receives fifth input 1050 and in response automatically detects and removes the region that corresponds to the fifth input 1050, while also maintaining the selection of any remaining region(s), as represented by a fifth indicator 1052 that is associated with the perimeter of Region B. Alternately, following FIG. 10E, the user can submit a sixth input 1060 associated with any portion of Region B, as shown with sixth indicator 1062 in FIG. 10G, if a user wished to isolate Region C rather than Region B.

It should be understood that in different implementations, while this type of 'deselect' mode may be available via menu options offered by the application, this mode may also be triggered by a different input type. In some cases, if a user wishes to deselect a quad that has been selected (as described herein with respect to FIGS. 1-10), they may—as an example—simply double-tap (two rapid taps in succession) the previously selected quad, and the application can be configured to automatically remove (undo) the corresponding region from selection. Other input types, including holding down a finger or mouse click on a selected quad for some minimum duration of time, or other types of clicks, keyboard shortcuts, or voice commands can also be used or custom configured by a user via the application settings to select/deselect regions.

Figure 11A:
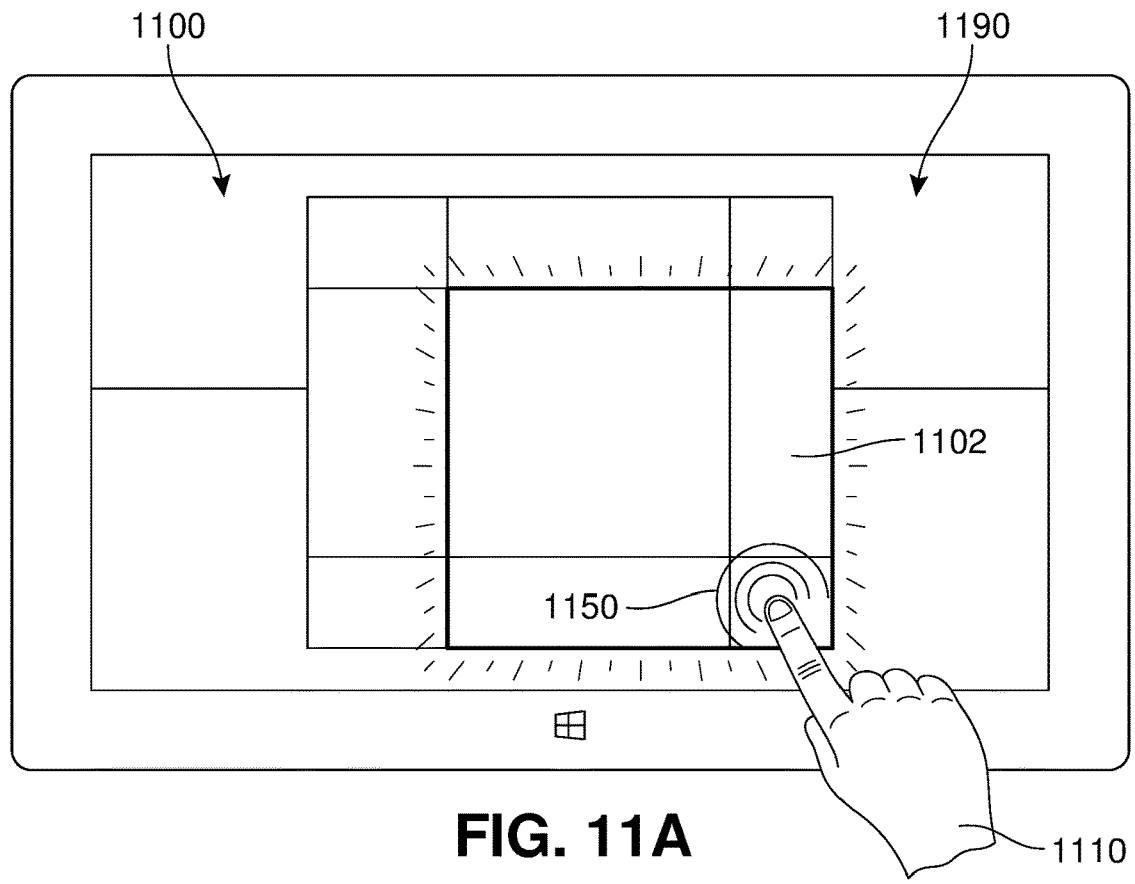
FIGS. 11A and 11B are display diagrams illustrating an implementation of a user interface for an application configured to provide scanning tools where a first user input causes a second, different region in the image to be selected.
Figure 11B:
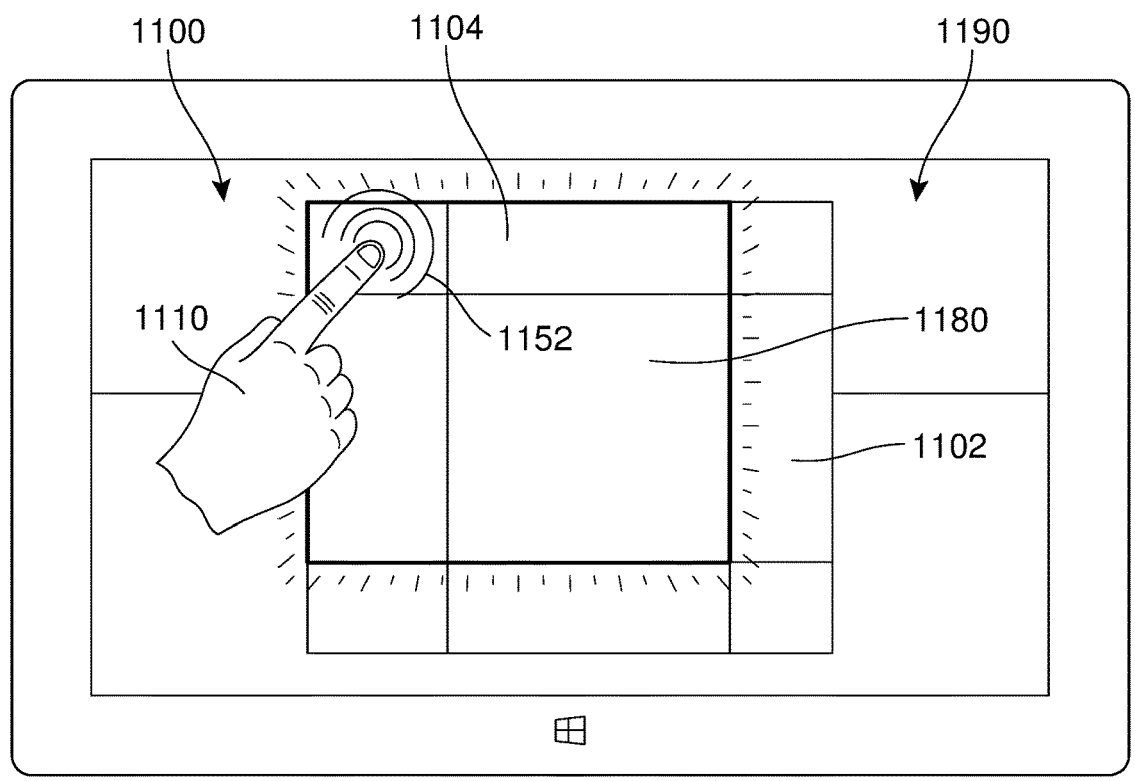

In FIGS. 11A and 11B, display diagrams illustrate another implementation of a user interface for a scanning application. In FIG. 11A, a first user input causes a first region in the image to be selected, as represented by a hand 1110 interacting with a display 1190. In this case, the user has tapped or contacted (or otherwise provides a type of input) the display 1190 at a first zone 1150 (represented by concentric arcs) of the display 1190, where it is understood that the user input indicates that the first zone 1150 is included, disposed, or located in the user's desired region. In response, the application 1100 may automatically initiate a search or detection of quadrangular regions that include at least the first zone 1150. In FIG. 11A, the proposed targeted area referred to herein as a first region 1102 is presented with an indicator, as discussed previously.

Referring next to FIG. 11B, the user taps or contacts the display 1190 at a second zone 1152, such that a second region 1104 is now presented as a potential candidate for scanning (as represented by an indicator), rather than the first region 1102 of FIG. 11A. It can be seen that each of first region 1102 in FIG. 11A and second region 1104 of FIG. 11B are arranged in an overlapping manner. In this case, the two regions share a common area 1180, while each region also includes a portion of the display area that is not shared between or common to the two regions. Thus, by allowing a user to simply contact or click a portion of the display that includes the desired region, a user can quickly indicate which region is desired, even when the regions are overlapping or otherwise include shared features, areas, and/or boundaries.

For purposes of clarity, FIG. 12 illustrates one implementation of a process for selecting a scanning region based on user-input. In this example, a first stage 1210 includes the presentation of the image on a display for a device, usually via a scanning application being accessed or executed by the device. In conjunction with this image, the application receives a user input that is associated with a particular area, portion, or zone of the image in second stage 1220, and can be used to designate a target zone. This input can usually be submitted via a user interface provided by the application and associated with the image. During third stage 1230, the application can determine whether there are any scannable quads available that include, bound, contain, enclose, or otherwise encompass this target zone, referred to as potential quad candidates. If there are no potential quad candidates (first substage 1232), the application can be configured to await further input or present alternate graphical element actuatable options or notifications via the interface.

If there are potential quad candidates (second substage 1234), the application will detect these one or more candidates in a fourth stage 1240. If multiple quads are detected that include the target zone (third substage 1242), the application can process the candidates via an algorithm that can determine and identify which quad candidate is most likely to represent the intended scanning region (see fifth stage 1250), and present the quad on the display, usually via the superimposition of a visual indicator in or around the region associated with the identified quad (see a sixth stage 1252). However, in cases where only one candidate is detected (fourth substage 1244), the application can substantially immediately identify the quad and present it on the display, via the superimposition of a visual indicator in or around the region associated with the identified quad (see sixth stage 1252).

In some implementations, the application can also be optionally configured to receive additional user input that can confirm whether the presented quad was in fact the desired scan region, as depicted by seventh stage 1260. If the user input corresponds with an accurate detection (fifth substage 1262), the application can automatically select the quad for scanning (see a seventh stage 1290), or add the quad to a group of quad regions that have been selected for scanning from the image. If instead the input corresponds to an undesirable region presentation (sixth substage 1264), the application can optionally respond by removing the visual indicator in an eighth stage 1266.

Furthermore, the application can ascertain whether there had been additional, alternative quad candidates that included the target zone in an eighth stage 1270. If there were no other candidates available (seventh substage 1272), the application can be configured to await further input or present alternate graphical element actuatable options or notifications via the interface. If other candidates were available (eighth substage 1274) the application can proceed to offer alternative quads in order of the likelihood of the candidate representing the intended quad, as shown in ninth stage 1280. The application can again seek or receive input regarding the accuracy of the presented quad candidate (seventh stage 1260) as described herein. It should be understood that in some other implementations, the submission of any other user input associated with a portion or zone of the image subsequent to the presentation of the quad in sixth stage 1252 can be interpreted by the application as an indication that the quad that was presented was not the one intended for scanning by the user, and can trigger a restart of the process, and/or move directly to an eighth stage 1270.

Figure 13:
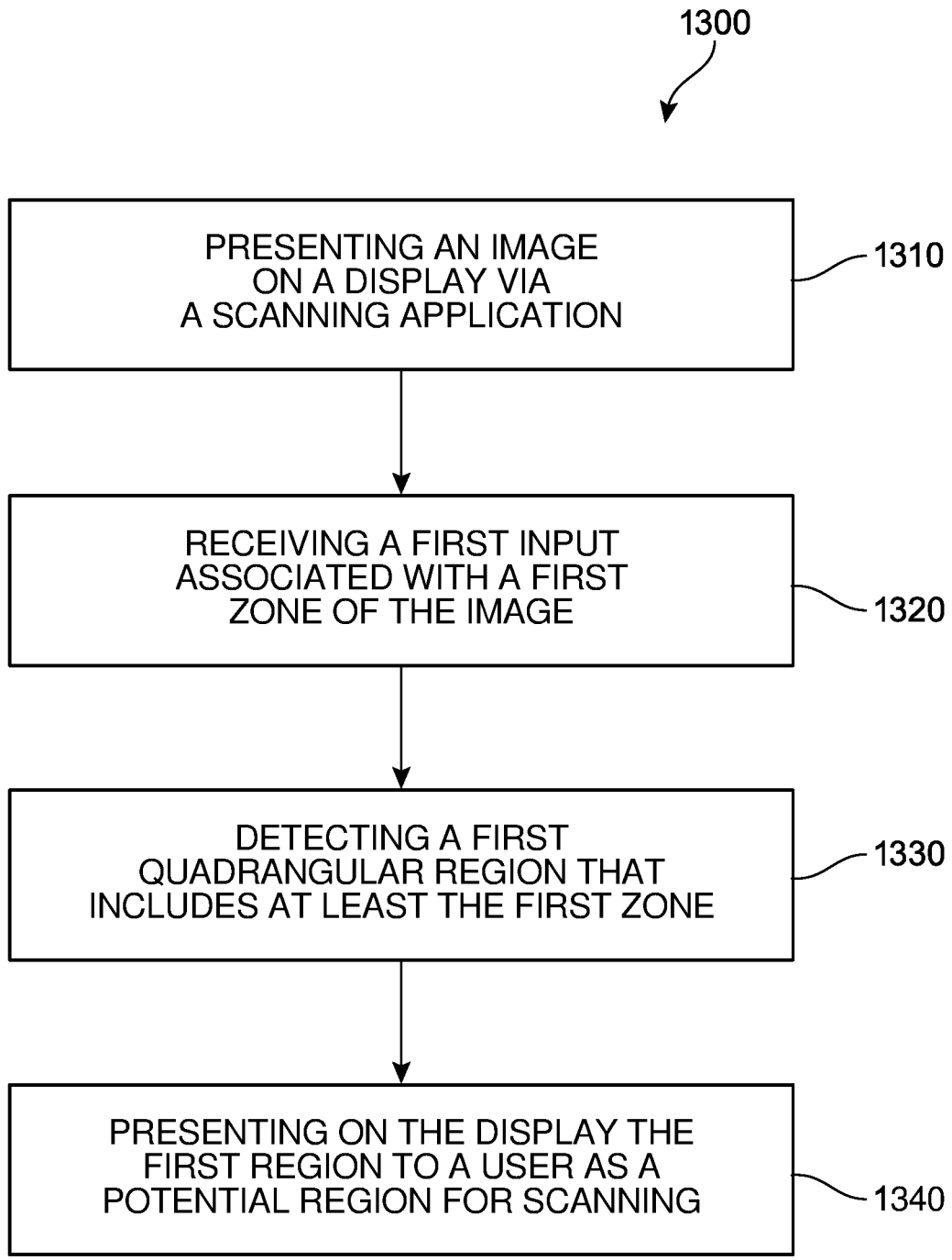
FIG. 13 is a flow diagram illustrating an implementation of a process for managing scanning selections.

FIG. 13 is a flow chart illustrating an implementation of a method 1300 of managing the detection and selection of potential scanning regions while viewing electronic content. In FIG. 13, a first step 1310 includes presenting, on a display of a user device, an image, for example, via an image scanning application. A second step 1320 includes receiving a first input associated with a first zone of the image. A third step 1330 includes automatically detecting, in response to receiving the first input, a first region that includes at least the first zone, the first region being bounded by a first perimeter. A fourth step 1340 includes presenting, on the display via the image scanning application, the first region to a user as a potential region for scanning.

In other implementations, the method can include additional or alternate steps. For example, the method may further include receiving a second input associated with a second zone of the image, where the second zone differs from the first zone, as well as automatically detecting, in response to the second input, a second region that differs from the first region and includes at least the second zone. As another example, the method may involve receiving a second input associated with the first zone of the image, and then automatically detecting, in response to the second input, a second region that differs from the first region and includes at least the first zone.

In another example, the method can include a designation of the first region by display of a visual indicator associated with the first perimeter. In some implementations, the method includes receiving a second input associated with the visual indicator, and then automatically selection, in response to the second input, of the first region for scanning. In some cases, the method further includes receiving a second input associated with the visual indicator, and then automatically adjusting, in response to the second input, a size of the first perimeter.

Furthermore, in some implementations, the method may involve selecting, in response to receiving the first input, the first region for scanning, and/or selecting, in response to receiving the second input, the second region for scanning. In another implementation, the method can include selecting, in response to receiving the first input, the first region for scanning, and/or deselecting, in response to receiving the second input, the first region for scanning.

In some implementations, the second region can include, surround, contain, and/or encompass the coordinates for both the first zone and the second zone. In another implementation, the second region excludes the coordinates of the image corresponding to the first zone. In yet another implementation, the first region excludes the second zone.

As another example, the method can include receiving a third input associated with the first zone of the image, and then automatically detecting, in response to the third input, a third region that differs from both the first region and the second region and includes at least the first zone. In addition, in cases where the second region is bounded by a second perimeter, the method may further include automatically selecting for scanning, in response to receiving the second input, an apertured region (similar to a quadrangular or other shape 'donut' or torus) that extends between the first perimeter and the second perimeter.

It should be understood that in different implementations, the method can vary. For example, another method that is within the scope of this application, also illustrated with respect to FIGS. 10A-10G, includes a first step of presenting an image on a display via an image scanning application, and a second step of receiving a first input associated with a first zone of the image. A third step includes automatically detecting and automatically presenting on the display, in response to receiving the first input, a first region that includes at least the first zone. In a fourth step, the method includes receiving a second input associated with a second zone of the image, where the second zone is disposed, positioned, or located outside of the first region in the image. In addition, the method includes automatically detecting and automatically presenting on the display, in response to receiving the second input, a second region that includes at least the first region.

In some implementations, the method also includes receiving a third input associated with a third zone of the image, where the third zone is disposed, positioned, or located outside of the second region in the image, and then automatically detecting and automatically presenting on the display, in response to receiving the third input, a third region that includes at least the second region. Furthermore, in some cases, the method includes receiving a fourth input associated with the first zone of the image, and automatically detecting and automatically presenting on the display, in response to receiving the fourth input, a fourth region that includes the second zone and the third zone and excludes the first zone. Alternatively, the method may include receiving a fourth input associated with the third zone of the image, and then automatically detecting and automatically presenting on the display, in response to receiving the fourth input, a fourth region that includes the first zone and the second zone and excludes the third zone.

Thus, the use of the disclosed systems and methods can enable users to easily tap to select a point in an image and in response provide one or more quad candidates that are identified as having that point in their interior. If a user taps at multiple places in succession, he or she will be presented with multiple quads in succession. The ability to deliberately select one or more regions in an image for scanning, both in real-time image capture and in stored images, offers a wide range of benefits to users. This feature substantially reduces the time needed to scan various items; rather than attempting to re-capture or modify images to obtain the desired region, a user may submit an input indicating a target locus that is present in the desired region, and the application can then automatically detect region(s) that include the target locus. Furthermore, by offering users a simple means by which to select multiple, discrete regions for scanning within a single image, multiple images need not be collected or stored to obtain the scans, and the process will occur over a much shorter duration.

For the sake of simplicity of description, details are not provided herein for performing various image processing steps. Implementations of the present disclosure can make use of any of the features, systems, components, devices, and methods described in U.S. Patent Publication Number 2011/0069180 to Nijemcevic et al., published Mar. 24, 2011 and entitled "Camera Based Scanning," as well as its disclosed methods and systems for the processing of images with regard to color, intensity, resolution, image effects and so forth, the disclosure of which is herein incorporated by reference in its entirety.

The detailed examples of systems, devices, and techniques described in connection with FIGS. 1-12 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 14:
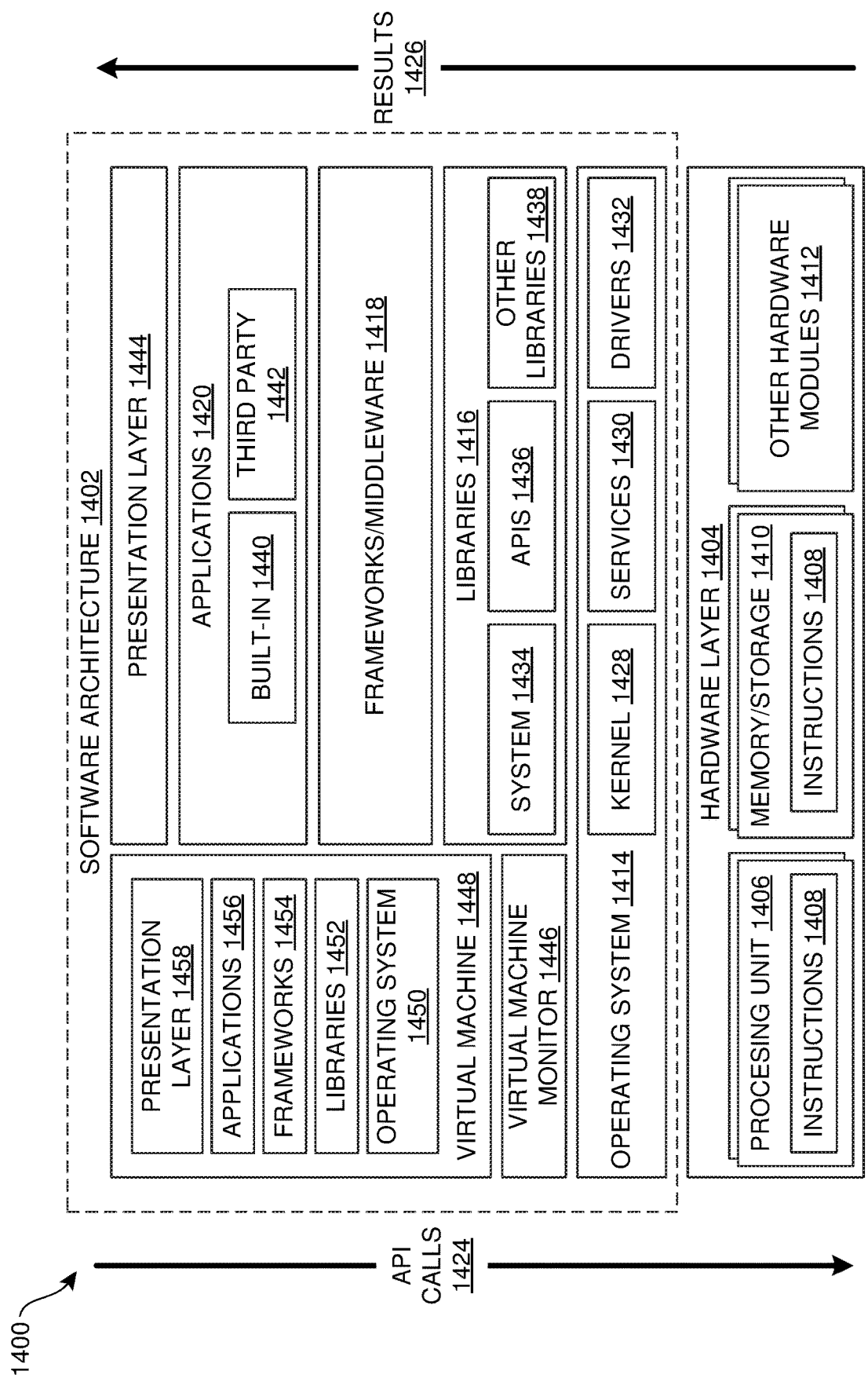
FIG. 14 is a block diagram of an example computing device, which may be used to provide implementations of the mechanisms described herein.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture and it will be appreciated that many other architectures may be implemented to facilitate the functionality described herein. The software architecture 1402 may execute on hardware such as a device 150 of FIG. 1A that includes, among other things, document storage 1070, processors, memory, and input/output (I/O) components. A representative hardware layer 1404 is illustrated and can represent, for example, the device 150 of FIG. 1. The representative hardware layer 1404 includes a processing unit 1406 and associated executable instructions 1408. The executable instructions 1408 represent executable instructions of the software architecture 1402, including implementation of the methods, modules and so forth described herein. The hardware layer 1404 also includes a memory/storage 1410, which also includes the executable instructions 1408 and accompanying data. The hardware layer 1404 may also include other hardware modules 1412.

Instructions 1408 held by processing unit 1408 may be portions of instructions 1408 held by the memory/storage 1410.

The example software architecture 1402 may be conceptualized as layers, each providing various functionality. For example, the software architecture 1402 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1440 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1000 of FIG. 10, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1450, libraries 1452, frameworks 1454, applications 1456, and/or a presentation layer 1458.

Figure 15:
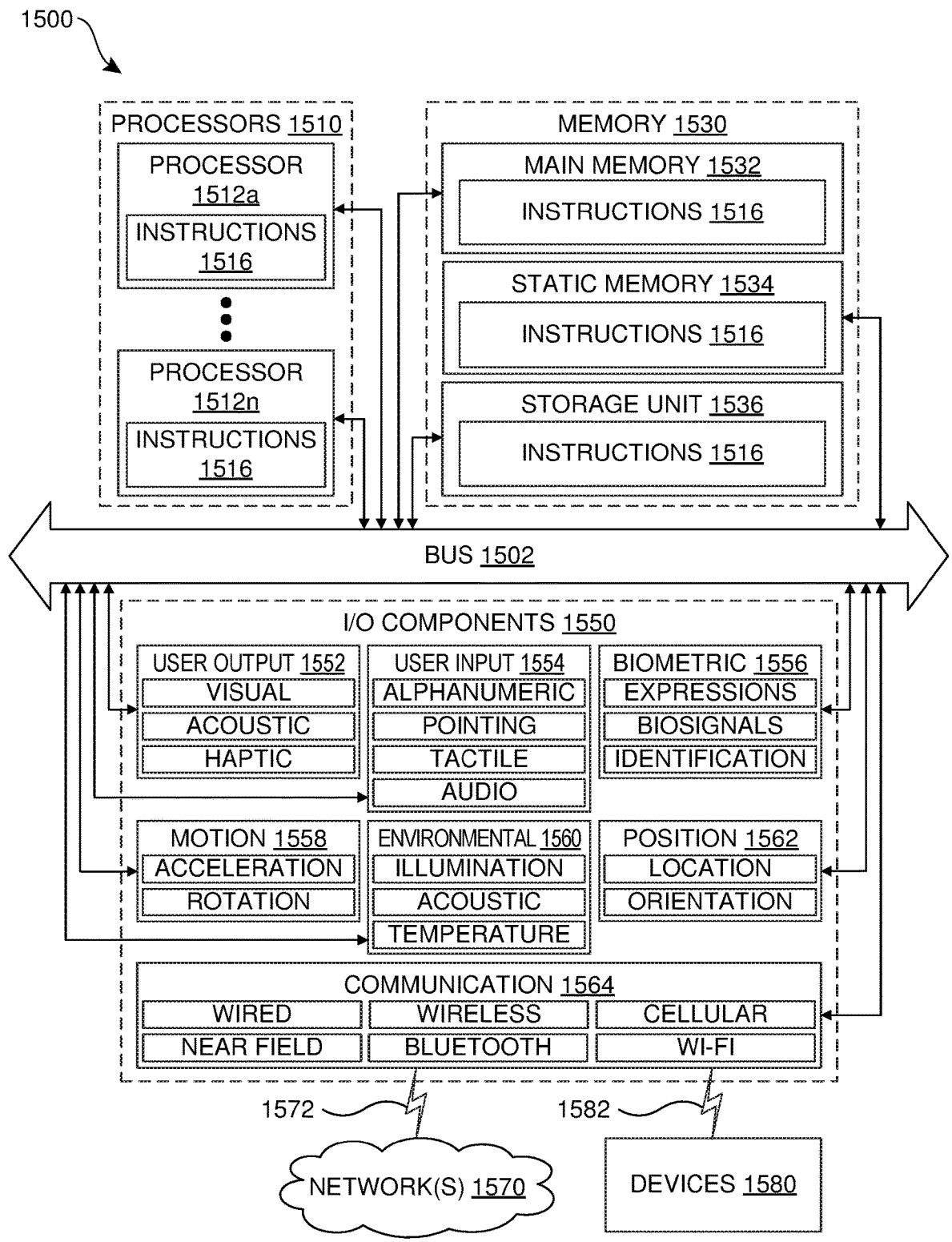
FIG. 15 is a block diagram illustrating components of an example machine configured to read instructions from a machine-readable medium.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors 1512a to 1512n that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1500 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 15 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556 and/or position components 1562, among a wide array of other environmental sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network(s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing device comprising:
   at least one processor; and
   one or more computer readable media including instructions which, when executed by the at least one processor, cause the at least one processor to:
      present an image on a display via an image scanning application,
      receive a first input associated with a first zone of the image indicating an intended scan region,
      automatically detect, in response to receiving the first input, a first region that includes at least the first zone, the first region including a boundary associated with a first perimeter; wherein the instructions configured to cause the processor to detect the first region include instructions to cause the processor to detect a plurality of candidate scan regions to estimate a probability that each of the plurality of the candidate scan regions represents the intended scan region, and to select the first region from the plurality of candidate scan regions based on the probability that the selected candidate scan region represents the intended scan region, and
   present, on the display via the image scanning application, the first region to a user as a potential region for scanning.

2. The device of claim 1, wherein the instructions further cause the at least one processor to:
   receive a second input associated with a second zone of the image, wherein the second zone differs from the first zone; and
   automatically detect, in response to the second input, a second region that differs from the first region and includes at least the second zone.

3. The device of claim 2, wherein the second region includes both the first zone and the second zone.

4. The device of claim 2, wherein the second region excludes the first zone.

5. The device of claim 2, wherein the first region excludes the second zone.

6. The device of claim 1, wherein the instructions further cause the at least one processor to:
   receive a second input associated with the first zone of the image; and
   automatically detect, in response to the second input, a second region that differs from the first region and includes at least the first zone.

7. The device of claim 1, wherein the instructions further cause the at least one processor to designate the first region by display of a visual indicator associated with the first perimeter.

8. The device of claim 1, wherein the instructions further cause the at least one processor to:
   receive a second input associated with a portion of the boundary of the first region; and
   adjust, in response to the second input, the boundary of the first region such that the boundary becomes associated with a second perimeter that differs from the first perimeter.

9. A method comprising:
   presenting an image on a display via an image scanning application;
   receiving a first input associated with a first zone of the image indicating an intended scan region;

automatically detecting, in response to receiving the first input, a first region that includes at least the first zone, the first region being bounded by a first perimeter by detecting a plurality of candidate scan regions that include the first zone, evaluating each of the plurality of candidate scan regions to estimate a probability that each of the plurality of the candidate scan regions represents the intended scan region, and selecting the first region from the plurality of candidate scan regions based on the probability that the selected candidate scan region represents the intended scan region; and presenting, on the display via the image scanning application, the first region to a user as a potential region for scanning.

10. The method of claim 9, further comprising:

receiving a second input associated with a second zone of the image, wherein the second zone differs from the first zone; and automatically detecting, in response to the second input, a second region that differs from the first region and includes at least the second zone.

11. The method of claim 10, further comprising:

selecting, in response to receiving the first input, the first region for scanning; and deselecting, in response to receiving the second input, the first region for scanning.

12. The method of claim 10, further comprising:

receiving a third input associated with the first zone of the image; and automatically detecting, in response to the third input, a third region that differs from both the first region and the second region and includes at least the first zone.

13. The method of claim 9, further comprising:

receiving a second input associated with the first zone of the image; and automatically detecting, in response to the second input, a second region that differs from the first region and includes at least the first zone.

14. The method of claim 9, further comprising:

designating the first region by display of a visual indicator associated with the first perimeter;

receiving a second input associated with the visual indicator; and automatically selecting, in response to the second input, the first region for scanning.

15. The method of claim 9, further comprising:

designating the first region by display of a visual indicator associated with the first perimeter;

receiving a second input associated with the visual indicator; and automatically adjusting, in response to the second input, a size of the first perimeter.

16. A method comprising:

presenting an image on a display via an image scanning application;

receiving a first input associated with a first zone of the image;

automatically detecting, in response to receiving the first input, a first region that includes at least the first zone, the first region being bounded by a first perimeter;

presenting, on the display via the image scanning application, the first region to a user as a potential region for scanning;

receiving a second input associated with a second zone of the image, wherein the second zone differs from the first zone;

automatically detecting, in response to the second input, a second region that differs from the first region and includes at least the second zone, wherein the second region is bounded by a second perimeter; and automatically selecting for scanning, in response to receiving the second input, an apertured region that extends between the first perimeter and the second perimeter.

17. A method comprising:

presenting an image on a display via an image scanning application;

receiving a first input associated with a first zone of the image;

automatically presenting, in response to receiving the first input, a first region that includes at least the first zone;

receiving a second input associated with a second zone of the image, the second zone being located outside of the first region;

automatically presenting, in response to receiving the second input, a second region that includes at least the first region as a potential region for scanning, receiving a third input associated with a third zone of the image, the third zone being located outside of the second region;

automatically presenting, in response to receiving the third input, a third region that includes at least the second region;

receiving a fourth input associated with the first zone of the image; and automatically presenting, in response to receiving the fourth input, a fourth region that includes the second zone and the third zone and excludes the first zone.

18. A method comprising:

presenting an image on a display via an image scanning application;

receiving a first input associated with a first zone of the image;

automatically presenting, in response to receiving the first input, a first region that includes at least the first zone;

receiving a second input associated with a second zone of the image, the second zone being located outside of the first region;

automatically presenting, in response to receiving the second input, a second region that includes at least the first region as a potential region for scanning;

receiving a third input associated with a third zone of the image, the third zone being located outside of the second region;

automatically presenting, in response to receiving the third input, a third region that includes at least the second region;

receiving a fourth input associated with the third zone of the image; and automatically presenting, in response to receiving the fourth input, a fourth region that includes the first zone and the second zone and excludes the third zone.

* * * * *